(12) United States Patent
Miller et al.

(10) Patent No.: US 10,596,829 B2
(45) Date of Patent: *Mar. 24, 2020

(54) COLOR DENSITY BASED THICKNESS COMPENSATION PRINTING

(71) Applicant: NIKE, Inc., Beaverton, OR (US)

(72) Inventors: Todd W. Miller, Portland, OR (US); Jeremy D. Walker, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/129,389

(22) Filed: Sep. 12, 2018

(65) Prior Publication Data

US 2019/0009574 A1 Jan. 10, 2019

Related U.S. Application Data

(63) Continuation of application No. 15/576,621, filed as application No. PCT/US2016/033460 on May 20, 2016, now Pat. No. 10,093,111.

(Continued)

(51) Int. Cl.
*B41J 2/21* (2006.01)
*B41J 3/407* (2006.01)
(Continued)

(52) U.S. Cl.
CPC .......... *B41J 3/4073* (2013.01); *A43B 3/0078* (2013.01); *A43D 8/22* (2013.01); *A43D 95/14* (2013.01);
(Continued)

(58) Field of Classification Search
CPC .................... B41J 15/046; B41J 11/0025
See application file for complete search history.

(56) References Cited

U.S. PATENT DOCUMENTS 6,210,776 B1 4/2001 Hill
7,974,727 B2 7/2011 Silverbrook
(Continued)

FOREIGN PATENT DOCUMENTS

CN 1260012 A 7/2000
CN 101394994 A 3/2009
(Continued)

OTHER PUBLICATIONS

94(4) Communication mailed in related European Patent Application No. 16734065.2, dated Jul. 6, 2018 (8 pages).
(Continued)

*Primary Examiner* — Lamson D Nguyen
(74) *Attorney, Agent, or Firm* — Klarquist Sparkman, LLP

(57) ABSTRACT

This application discloses methods of printing a three-dimensional object on a base using a printing device. One method includes printing a color layer of the three-dimensional object onto a region of the base. The color layer has a color thickness corresponding to a selected color intensity of a color. The method also includes determining a structural thickness for a structural layer of the three-dimensional object by calculating a difference between the color thickness and a target thickness of the three-dimensional object. The target thickness is greater than the color thickness. The method further includes printing the structural layer having the structural thickness directly onto the color layer.

20 Claims, 18 Drawing Sheets

Related U.S. Application Data

(60) Provisional application No. 62/166,965, filed on May 27, 2015.

(51) Int. Cl.

| | | |
|---|---|---|
| *B41M 5/00* | (2006.01) | |
| *D06P 5/30* | (2006.01) | |
| *A43D 95/14* | (2006.01) | |
| *A43B 3/00* | (2006.01) | |
| *A43D 8/22* | (2006.01) | |
| *B29C 64/112* | (2017.01) | |
| *B33Y 10/00* | (2015.01) | |
| *B41J 2/045* | (2006.01) | |
| *B41M 3/00* | (2006.01) | |
| *D06P 5/15* | (2006.01) | |

(52) U.S. Cl.
CPC ............ *B29C 64/112* (2017.08); *B33Y 10/00* (2014.12); *B41J 2/04541* (2013.01); *B41J 2/04586* (2013.01); *B41J 2/21* (2013.01); *B41J 2/2114* (2013.01); *B41J 2/2117* (2013.01); *B41J 3/4078* (2013.01); *B41M 3/008* (2013.01); *B41M 5/0088* (2013.01); *D06P 5/15* (2013.01); *D06P 5/30* (2013.01); *B29K 2995/0021* (2013.01)

(56) References Cited

U.S. PATENT DOCUMENTS

| | | | |
|---|---|---|---|
| 9,446,556 B2 | 9/2016 | Hosier et al. | |
| 9,833,948 B2 | 12/2017 | Stava | |
| 10,093,111 B2 * | 10/2018 | Miller | A43D 95/14 |
| 2011/0116117 A1 | 5/2011 | Abergel et al. | |
| 2012/0218337 A1 | 8/2012 | Oya | |
| 2014/0132670 A1 | 5/2014 | Ikeda et al. | |
| 2015/0002567 A1 | 1/2015 | Miller | |

FOREIGN PATENT DOCUMENTS

| | | |
|---|---|---|
| CN | 103648783 A | 3/2014 |
| WO | WO 2014/015037 A2 | 1/2014 |

OTHER PUBLICATIONS

International Search Report and Written Opinion of the International Searching Authority, dated Sep. 21, 2016, for corresponding International Application No. PCT/US2016/033460, 10 pages.

First Office Action issued in related Chinese Application No. 2016800268065, dated Jul. 12, 2019, 7 pages.

* cited by examiner

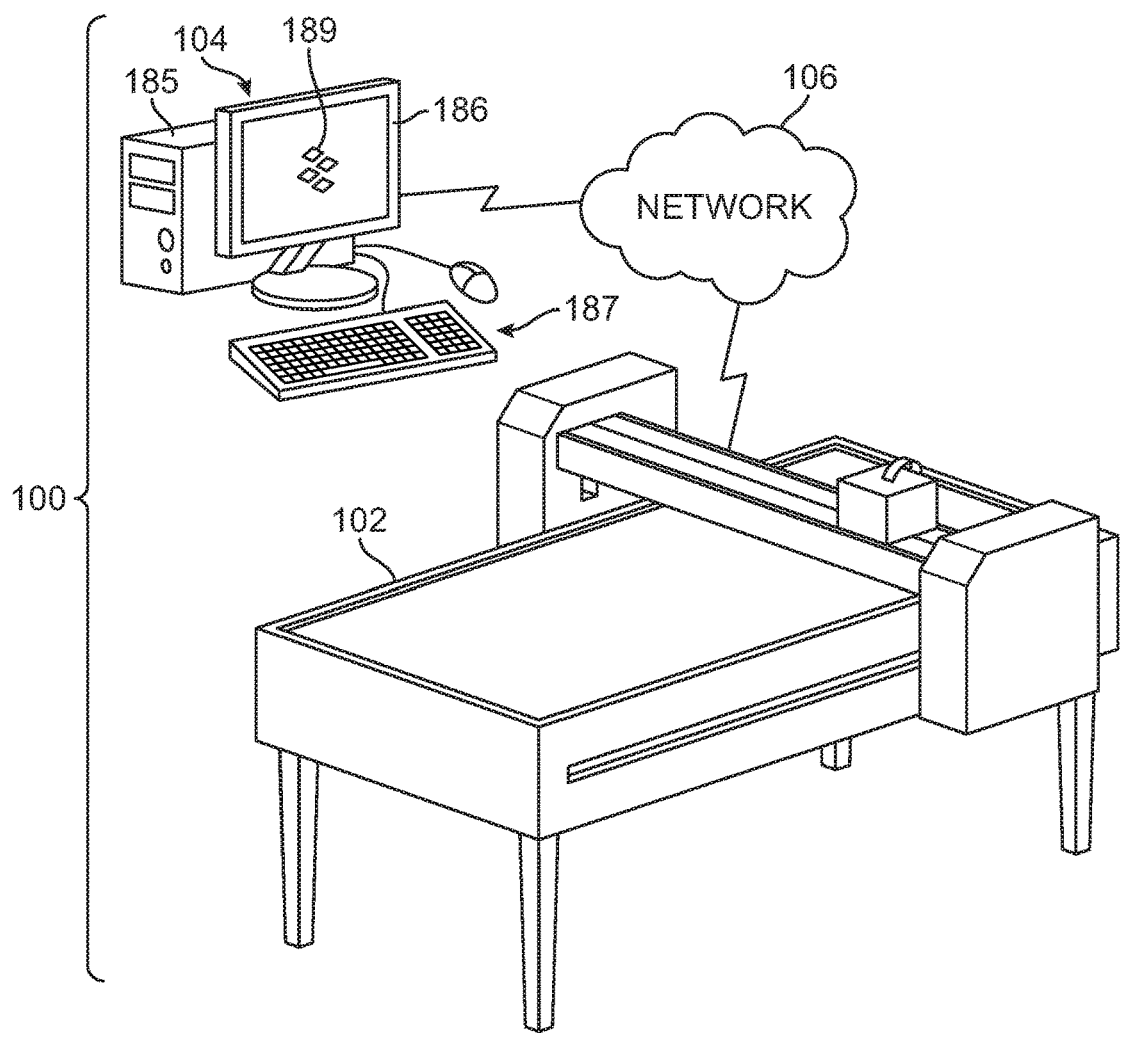
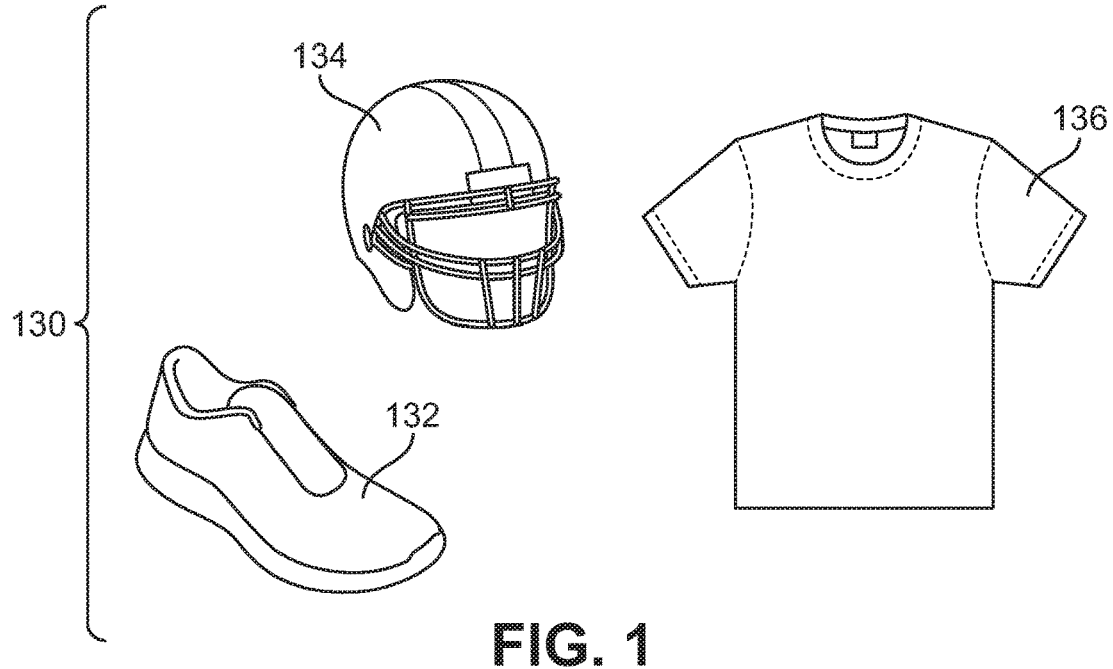
FIG. 1

US 10,596,829 B2

COLOR DENSITY BASED THICKNESS COMPENSATION PRINTING

CROSS-REFERENCE TO RELATED APPLICATIONS

This application is a continuation of U.S. application Ser. No. 15/576,621, filed Nov. 22, 2017, which is the U.S. National Stage of International Application No. PCT/US2016/033460, filed May 20, 2016, which claims the benefit of U.S. Provisional Application No. 62/166,965, filed May 27, 2015. Each related application is incorporated by reference herein.

BACKGROUND

Some embodiments relate generally to printing on substrates such as fabric of articles of apparel. Such articles of apparel may include shirts, shorts, pants, jackets, hats, and caps. Some embodiments relate generally to printing on substrates such as fabric of articles of footwear. Such articles of footwear may be configured for various activities, such as running, training, jogging, hiking, walking, volleyball, handball, tennis, lacrosse, and basketball. Some embodiments relate to printing on various other substrates, such as backpacks and tents.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 1 shows a schematic diagram of a printing system, in accordance with an exemplary embodiment;

DETAILED DESCRIPTION

Figure 2:
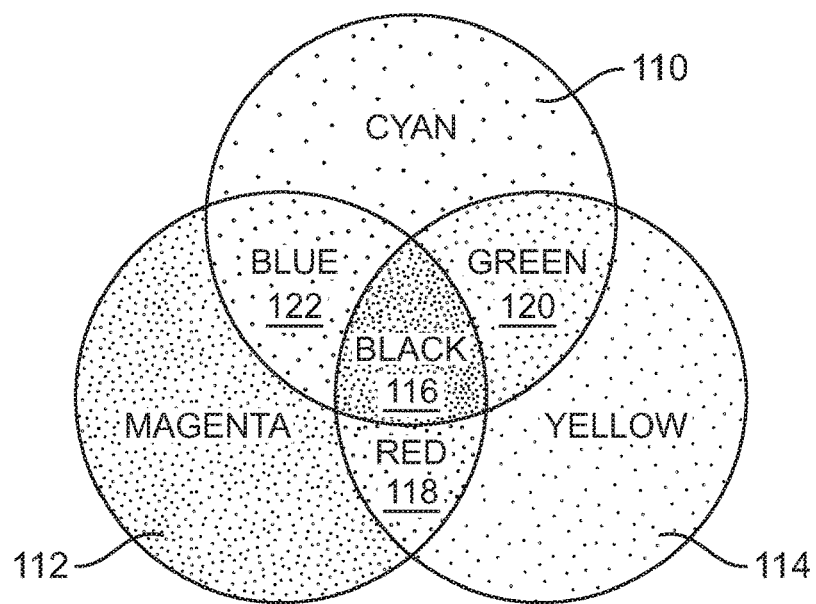
FIG. 2 shows a CMYK Venn diagram, in accordance with an exemplary embodiment.

For clarity, the detailed descriptions herein describe certain exemplary embodiments, but the disclosure in this application may be applied to any method for fabricating any article including certain of the features described herein and recited in the claims. In particular, although the following detailed description describes certain exemplary embodiments, it should be understood that other embodiments may be used for the fabrication of other articles of footwear or apparel.

This summary is intended to provide an overview of the subject matter of this patent, and is not intended to identify essential elements or key elements of the subject matter, nor is it intended to be used to determine the scope of the claimed embodiments. The proper scope of this patent may be ascertained from the claims set forth below in view of the detailed description below and the drawings.

As used herein, the terms "printer," "plotter," "three-dimensional printer," or "three-dimensional printing system" may refer to any type of system that can print multiple layers onto a fabric, an article of footwear, an article of apparel or other article, including sign and graphics printers. The printers may use any appropriate type of UV-curable print material, including acrylic resin, polyurethane, TPU, or silicone or any other appropriate print material.

In one aspect, a method includes determining a target thickness for a region of the three-dimensional object and determining a color for the region. The color is assigned a color density. The method further includes determining a color thickness for the color based on the color density. The target thickness is independent from the color thickness. The method further includes printing a color layer having the color thickness in the region, determining a structural thickness for a structural layer of the region based on the color thickness and the target thickness, and printing the structural layer having the structural thickness directly onto the color layer. A combination of the color layer and the structural layer has the target thickness.

In another aspect, a method includes receiving a first color for a first pixel of a plurality of pixels. The first pixel is assigned a first target thickness. The method further includes receiving a second color for a second pixel of the plurality of pixels, estimating a first color thickness to print the first color, and estimating a second color thickness to print the second color. Additionally, the method includes printing a first color layer having the first color in a first region of the three-dimensional object corresponding with the first pixel and printing a second color layer having the second color in a second region of the three-dimensional object corresponding with the second pixel. The first color thickness and the second color thickness are different. The method further includes calculating a first structural thickness for a first structural layer of the first region based on the first color thickness and the first target thickness and printing the first structural layer directly onto the first color layer. The first structural layer has the first structural thickness. The method further includes printing a second structural layer directly onto the second color layer. The second structural layer has a second structural thickness. The first structural thickness and the second structural thickness are different.

In one aspect, a system includes a print controller and a printing device. The print controller is configured to receive a color for each pixel of a plurality of pixels, prepare color print instructions based on the color for each pixel of the plurality of pixels, and receive a thickness for each pixel of the plurality of pixels. The print controller is further configured to prepare thickness print instructions based on the thickness for each pixel of the plurality of pixels, transmit the color print instructions to a printing device, and transmit the thickness print instructions to the printing device. The printing device is configured to receive the color print instructions from the print controller, receive the thickness print instructions from the print controller, and designate each region of a plurality of regions of the three-dimensional object with a color of a corresponding pixel of the plurality of pixels based on the color print instructions. The printing device is further configured to designate each region of the plurality of regions with a thickness of a corresponding pixel of the plurality of pixels based on the thickness print instructions, selectively print one or more color layers on the base according to a designation of each region of the plurality of regions with the color of a corresponding pixel of the plurality of pixels, and selectively print one or more structural layers on the base. Each structural layer of one or more structural layers has a structural thickness reduced by a color thickness of a color layer of one or more color layers. The step of selectively printing one or more structural layers prints one or more structural layers with a substantially planar exposed surface.

Other systems, methods, features, and advantages of the embodiments will be, or will become, apparent to one of ordinary skill in the art upon examination of the following figures and detailed description. It is intended that all such additional systems, methods, features, and advantages be included within this description and this summary be within the scope of the embodiments.

Although the drawings and the textual description herein only describe embodiments as they may be used on certain articles of footwear or certain articles of apparel, the descriptions herein may also be applied to other articles of footwear and/or to other articles of apparel, including articles of footwear such as running, training, jogging, hiking, walking, volleyball, handball, tennis, lacrosse, basketball shoes, and other similar articles of footwear, or articles of apparel such as shorts, shirts, jerseys, jackets, pants, gloves, wrist bands, head bands, arm bands, hats, or caps, as well as to other articles such a backpacks or tents.

FIG. 1 is a schematic view of an embodiment of a three-dimensional printing system 100, also referred to simply as printing system 100. Some embodiments of the printing system can include provisions that distribute one or more functions among different devices of the printing system. As shown, printing system 100 may include printing device 102, computing system 104, and network 106. In other embodiments, the printing system may be a single device or component (not shown).

Some embodiments of the printing device can include provisions that permit color printing. In some embodiments, the printing system may use CMYK printing. In other embodiments, the color printing may be conducted using another suitable printing method.

In those instances where color printing is conducted using CMYK printing, any suitable device, protocol, standard, and method may be used to facilitate the color printing. As used herein, "CMYK" may refer to four pigments used in color printing: "C" for a cyan pigment, "M" for a magenta pigment, "Y" for a yellow pigment, and "K" for a black pigment. An example of a printing device using CMYK printing is disclosed in Miller, U.S. Patent Publication Number 2015-0002567, published on Jan. 1, 2015, titled "Additive Color Printing" (U.S. patent application Ser. No. 13/927,551, filed on Jun. 26, 2013), which application is herein incorporated by reference and referred to hereafter as the "Color Printing" application. In some embodiments, printing system 100 can include one or more features of the systems, components, devices, and methods disclosed in the Color Printing application to facilitate color printing. For example, printing device 102 may be configured to print an image by dispensing droplets of a print material including one or more pigments onto a base. As used herein, droplets may refer to any suitable volume of print material. For example, a droplet may be one milliliter of print material. In other embodiments, printing system 100 may use other systems, components, devices, and methods.

In those instances where the printing system includes provisions that distribute one or more functions among different devices of the printing system, any suitable division may be used. In some embodiments, printing system 100 can include provisions that control and/or receive information from printing device 102. These provisions can include a computing system 104 and a network 106. Generally, the term "computing system" refers to the computing resources of a single computer, a portion of the computing resources of a single computer, and/or two or more computers in communication with one another. Any of these resources can be operated by one or more human users. In some embodiments, computing system 104 may include one or more servers. In some embodiments, a print server may be primarily responsible for controlling and/or communicating with printing device 102, while a separate computer (e.g., desktop, laptop, or tablet) may facilitate interactions with a user. Computing system 104 can also include one or more storage devices including, but not limited to, magnetic, optical, magneto-optical, and/or memory, including volatile memory and non-volatile memory.

In those instances where a computing system is used, any suitable hardware or hardware systems may be used to facilitate provisions that control and/or receive information from printing device 102. In some embodiments, where a computing system is used, computing system 104 may include a central processing device 185, viewing interface 186 (e.g., a monitor or screen), input devices 187 (e.g., keyboard and mouse), and software for designing a computer-aided design representation 189 of a printed structure. However, in other embodiments, other forms of hardware systems may be used.

In those instances where software for designing a computer-aided design representation 189 of a printed structure is used, any suitable information may be used to facilitate provisions for software for designing a computer-aided design representation 189 of a printed structure. In at least some embodiments, software for designing a computer-aided design representation 189 of a printed structure may include not only information about the geometry of the structure but also information related to the materials required to print various portions of the structure. However, in other embodiments, different information may be used.

In those instances where software for designing a computer-aided design representation 189 of a printed structure is used, any suitable design structure may be used to transform the design into information that can be interpreted by printing device 102 (or a related print server in communication with printing device 102). In some embodiments, printing system 100 may be operated as follows to provide one or more structures that have been formed using a three-dimensional printing, or additive process. Computing system 104 may be used to design a structure. This may be accomplished using some type of CAD software, or other kind of software. The design may then be transformed into information that can be interpreted by printing device 102 (or a related print server in communication with printing device 102). In some embodiments, the design may be converted to a three-dimensional printable file, such as a stereolithography file (STL file); in other cases, the design may be converted into a different design structure.

In those instances where the printing system includes provisions that distribute one or more functions among different devices of printing system 100, any suitable protocol, format, and method may be used to facilitate communication among the devices of printing system 100. In some embodiments, these communications are conducted using network 106; in other cases, these communications may be conducted directly between devices of printing system 100.

In those instances where a network is used, network 106 may use any wired or wireless provisions that facilitate the exchange of information between computing system 104 and printing device 102. In some embodiments, network 106 may further include various components such as network interface controllers, repeaters, hubs, bridges, switches, routers, modems, and firewalls. In some embodiments, network 106 may be a wireless network that facilitates wireless communication between two or more systems, devices, and/or components of printing system 100. Examples of wireless networks include, but are not limited to, wireless personal area networks (including, for example, Bluetooth), wireless local area networks (including networks utilizing the IEEE 802.11 WLAN standards), wireless mesh networks, mobile device networks as well as other kinds of wireless networks. In other cases, network 106 could be a wired network including networks whose signals are facilitated by twister pair wires, coaxial cables, and optical fibers. In still other cases, a combination of wired and wireless networks and/or connections could be used.

Some embodiments of the printing system can include provisions that permit printed structures to be printed directly onto one or more articles. The term "articles" is intended to include both articles of footwear (e.g., shoes) and articles of apparel (e.g., shirts, pants, etc.). As used throughout this disclosure, the terms "article of footwear" and "footwear" include any footwear and any materials associated with footwear, including an upper, and may also be applied to a variety of athletic footwear types, including baseball shoes, basketball shoes, cross-training shoes, cycling shoes, football shoes, tennis shoes, soccer shoes, and hiking boots. As used herein, the terms "article of footwear" and "footwear" also include footwear types that are generally considered to be nonathletic, formal, or decorative, including dress shoes, loafers, sandals, slippers, boat shoes, and work boots.

While the disclosed embodiments are described in the context of articles of footwear, various embodiments may further be equally applied to any article of clothing, apparel, or equipment that includes three-dimensional printing. For example, various embodiments may be applied to hats, caps, shirts, jerseys, jackets, socks, shorts, pants, undergarments, athletic support garments, gloves, wrist/arm bands, sleeves, headbands, any knit material, any woven material, any nonwoven material, sports equipment, etc. Thus, as used herein, the term "article of apparel" may refer to any apparel or clothing, including any article of footwear, as well as hats, caps, shirts, jerseys, jackets, socks, shorts, pants, undergarments, athletic support garments, gloves, wrist/arm bands, sleeves, headbands, any knit material, any woven material, any nonwoven material, and the like.

Referring to FIG. 1, which shows an embodiment including set of articles 130, in other embodiments, different articles may be used. As shown, set of articles 130 includes an article of footwear 132, a helmet 134, and a shirt 136.

In those instances where the printing device prints onto an article, any suitable surface of the article may be used as a base to receive the three-dimensional objects. In some embodiments, the article includes a surface in a flattened configuration. For example, shirt 136 may have a front surface and/or a back surface in a flattened configuration. However, in other embodiments, an article may include a surface having a three-dimensional configuration. For example, a side surface of article of footwear 132 may have a three-dimensional configuration. In another example, a top surface of helmet 134 may have a three-dimensional configuration. In other embodiments, the printing device and/or printing system may print onto other surfaces.

Some embodiments of the printing system can include provisions that permit printing directly onto the article. In other cases, the three-dimensional object is first printed onto a release layer and then transferred onto the article.

In those instances where the printing system prints directly onto the article, any suitable material may be used to form the article to facilitate use of the article. In some embodiments, printing device 102 may be capable of printing onto the surfaces of various materials such as a textile, natural fabric, synthetic fabric, knit, woven material, nonwoven material, mesh, leather, synthetic leather, polymer, rubber, and foam, or any combination of them, without the need for a release layer interposed between a base and the bottom of the print material, and without the need for a perfectly or near perfectly flat base surface on which to print.

In those instances where CMYK printing is used, CMYK may produce or approximate any color in the visible spectrum by printing and intermixing various combinations of pigments, as exemplified by the CMYK Venn diagram shown in FIG. 2. Referring to FIG. 2, pigments for the colors cyan 110, magenta 112, and yellow 114 may be intermixed to produce one or more colors of red 118, green 120, and blue 122 as shown. Further intermixing of pigments may be used to produce many more colors beyond red 118, green 120, and blue 122, cyan 110, magenta 112, and yellow 114.

As indicated above, some embodiments of CMYK printing can include provisions that permit intermixing of two or more pigments. In some embodiments, two or more pigments may be intermixed before dispensing. For example, a pigment for yellow 114 and a pigment for cyan 110 may be mixed to form green 120. In the example, the pigments for green 120 may be premixed and stored in a cartridge for printing. In other cases, two or more pigments may be intermixed during printing. For example, the pigment for yellow 114 and the pigment for cyan 110 may be dispensed directly onto a base and intermix on the base to form green 120. In other embodiments, other intermixing of two or more pigments may be used.

Some embodiments of CMYK may print black by intermixing pigments for cyan 110, magenta 112, and yellow 114. For example, as shown in FIG. 2, pigments for cyan 110, magenta 112, and yellow 114 may be intermixed to produce black 116. However, in some embodiments, black 116 produced by intermixing pigments for cyan 110, magenta 112, and yellow 114 may appear visually to an observer as a lighter black instead of a very dark or saturated black. So, in those instances where black produced by intermixing appears visually to an observer as a lighter black, a CMYK printer may also include a separate cartridge or reservoir for having premixed pigments for producing black 116.

In some embodiments, CMYK print material may be considered subtractive in nature, in that they may reduce the whiteness of an underlying white base when viewed by reflected visible light by masking it with one or more layers of printed CMYK print material. In other embodiments, CMYK print material may include a white that may enhance the whiteness of an underlying white base when viewed by reflected visible light.

In those instances where CMYK printing is used, any suitable print material may be used to facilitate color printing. In some embodiments, CMYK print materials may be water-based. In other embodiments, CMYK print materials may be oil-based. In some embodiments, CMYK print material may include a structural print material. In other embodiments, CMYK print material may include only pigments.

In those instances where a CMYK print material includes a structural print material, the structural material may have any suitable property. In some embodiments, CMYK print materials may include a clear and/or transparent structure print material. In some embodiments, CMYK print materials may include an opaque structure print material. In some embodiments, the CMYK print material may include a translucent structure print material. In other embodiments, the structural material may have a combination of transparent structural material and/or translucent structural material.

Figure 3:
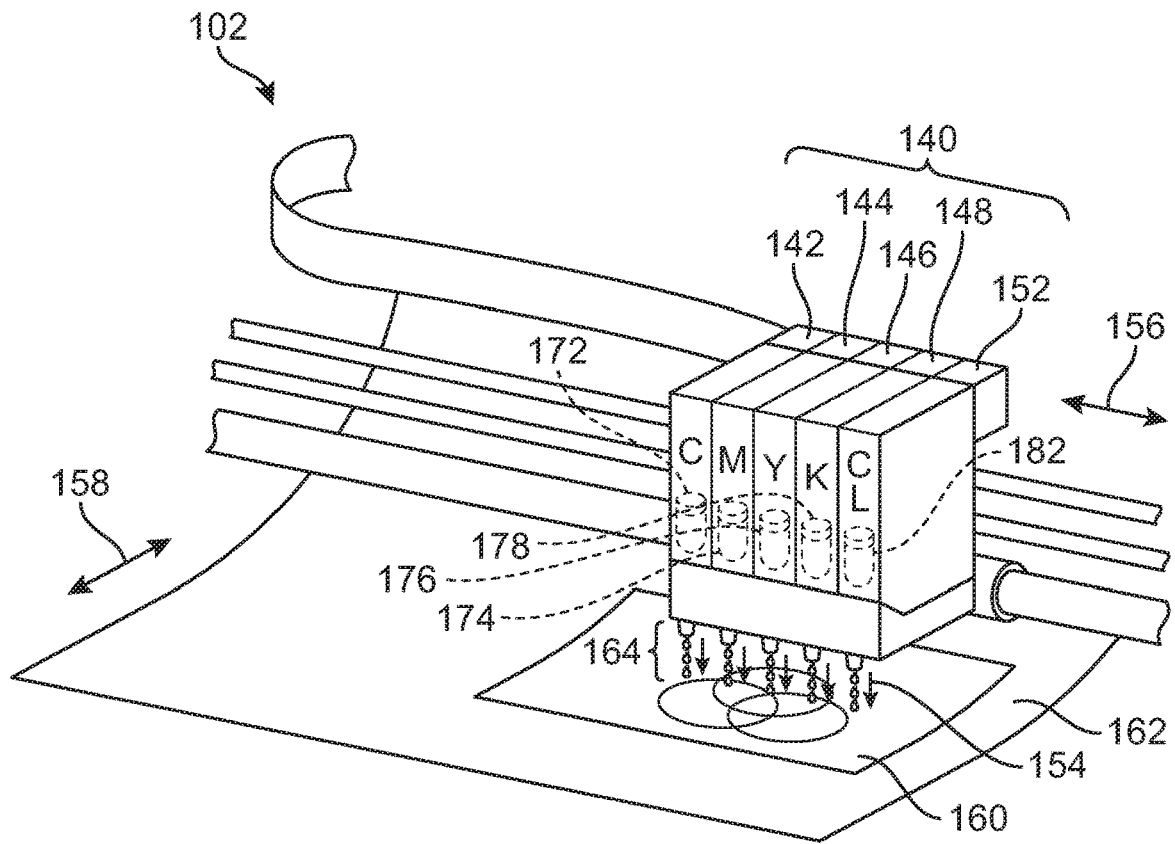
FIG. 3 shows a perspective view of a portion of a printer having CMYK printing capabilities, in accordance with an exemplary embodiment.

Referring to FIG. 3, which shows an embodiment of CMYK printing, printing device 102 is shown to include print head assembly 140. The print head assembly may include any number of cartridges. In some embodiments, print head assembly 140 may include cartridge 142 having cyan print material 172, cartridge 144 having magenta print material 174, cartridge 146 having yellow print material 176, cartridge 148 having black ("K") print material 178, and cartridge 152 having clear print material 182. In other embodiments, the print head assembly may use other cartridges. In some embodiments, printing device 102 may include a white cartridge (not shown). While one cartridge for each material is depicted in FIG. 3, consistent with some embodiments, printing device 102 may contain more than one cartridge for one or more of the print materials of print head assembly 140. That is, printing device 102 may include a second clear cartridge (not shown). In other embodiments, printing device 102 may include other cartridges.

Some embodiments of printing device 102 can include provisions that permit various colors in the visible spectrum to be transparent. In some embodiments, cyan print material 172 contained in cartridge 142, magenta print material 174 contained in the cartridge 144, and yellow print material 176 contained in the cartridge 146 may be clear and/or transparent. For example, the cyan print material 172 contained in cartridge 142, magenta print material 174 contained in the cartridge 144, and yellow print material 176 contained in the cartridge 146 may include a clear and/or transparent structure print material.

In some embodiments, printing device 102 can include provisions that permit various colors in the visible spectrum to be opaque. In the exemplary embodiment, black print material 178 contained in the cartridge 148 may be opaque. For example, black print material 178 contained in the cartridge 148 may include an opaque structure print material. In another example, black print material 178 contained in the cartridge 148 may include an opaque pigment and a clear and/or transparent structure print material.

Some embodiments of printing device 102 can include provisions that permit intermixing of two or more pigments. In some embodiments, printing device 102 intermixes two or more pigments before dispensing. For example, a pigment of yellow print material 176 and a pigment of cyan print material 172 may be intermixed to form a green print material. In the example, the green print material may be premixed and stored in a cartridge of print head assembly 140 for printing (not shown). In other cases, printing device 102 intermixes two or more pigments during printing. For example, printing device 102 dispenses droplets 164 containing yellow print material 176 from cartridge 146 and cyan print material 172 from cartridge 142 directly onto a base 162. In the example, droplets 164 may intermix on base 162 to form the green print material.

Some embodiments of printing device 102 include provisions that permit print head assembly 140 to be moved across base 162 to facilitate printing of features 160, such as images, graphics, designs, and text onto base 162. In some embodiments, printing device 102 moves print head assembly 140 along base 162. In other embodiments, printing device 102 may move base 162 in relation to print head assembly 140.

In those instances where the printing device moves the print head assembly, the printing device may move the print head assembly parallel to any number of suitable axes. In some embodiments shown in FIG. 3, printing device 102 may move print head assembly 140 along base 162. For example, as shown, printing device 102 may move print head assembly 140 parallel to first axis 156 and/or parallel to second axis 158. As shown, first axis 156 may extend parallel to base 162 and second axis 158 may extend parallel to base 162 and perpendicular to first axis 156. In some embodiments, printing device 102 may raise and/or lower the print head assembly 140 along third axis 154 that may be normal to base 162.

In those instances where the printing device moves the base, the printing device may move the base parallel to any number of various axes. In some embodiments shown in FIG. 3, printing device 102 may move base 162 parallel to first axis 156 and/or parallel to second axis 158. In some embodiments, printing device 102 may elevate and/or lower base 162 relative to print head assembly 140 along third axis 154.

Some embodiments of the printing system can include provisions that account for a perceived color intensity of a color. In some embodiments, printing system 100 assigns a color density to a color to account for the perceived color intensity of the color. As used herein, a color may refer to a single pigment of the pigments CMYK, for example, yellow, as well as two or more pigments of the pigments CMYK intermixed, for example, red. In other embodiments, printing system 100 may assign a color thickness of a color without using a color density.

Figure 4:
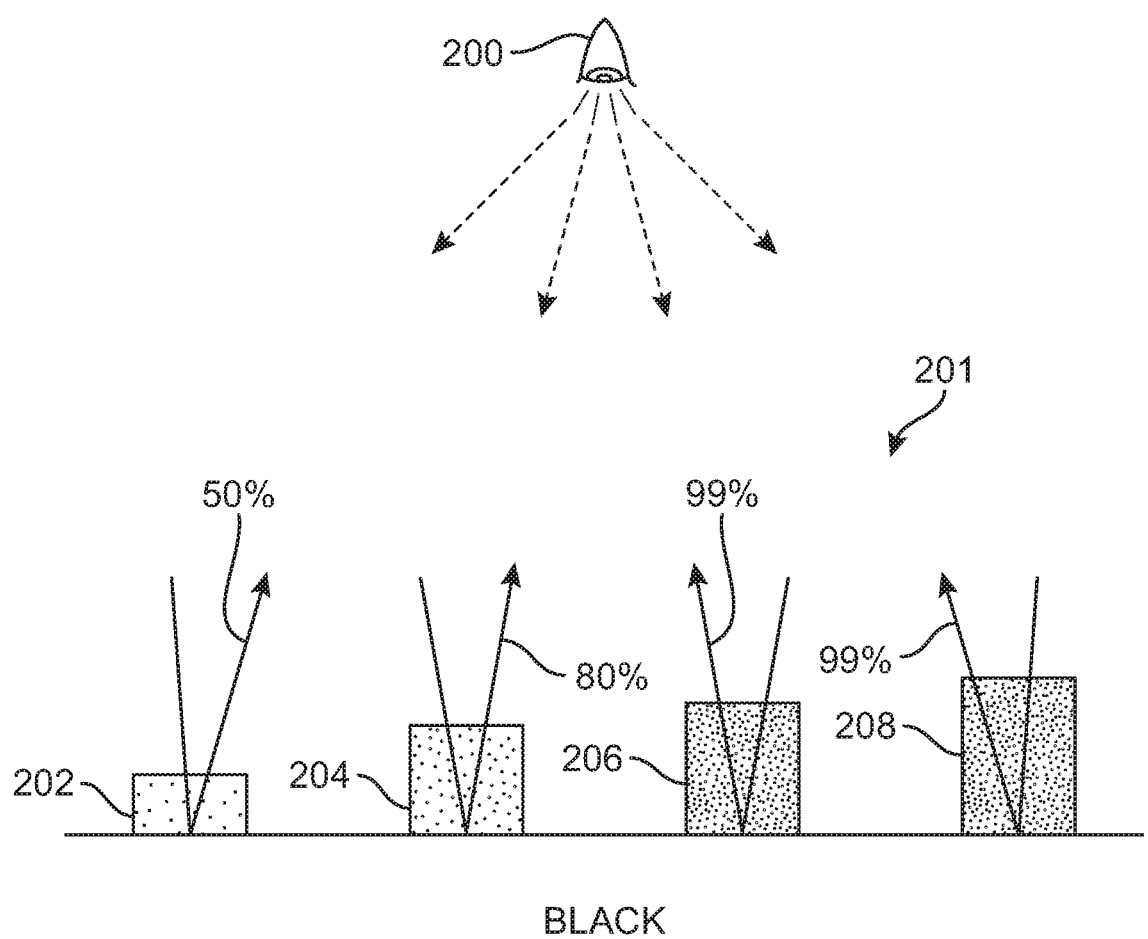
FIG. 4 shows a schematic view of a first color at various color densities, in accordance with an exemplary embodiment.

In those instances where a color density is used, a color density may correspond with any volume of print material. As used herein, a color density may refer to an amount of printed material in a fixed area (e.g., a pixel or other predefined area on a printing substrate). That is, increasing a color density may result in a corresponding increase in a volume of print material within the fixed area, thereby increasing a color thickness. Similarly, decreasing a color density may result in a corresponding decrease in a volume of print material within the fixed area, thereby decreasing a color thickness. Referring to FIG. 4, a first set of color densities 201 includes first color density 202, second color density 204, third color density 206, and a fourth color density 208. As shown, first color density 202 corresponds with a first volume (e.g., 30 droplets) of print material less than a second volume (e.g., 50 droplets) of print material corresponding with second color density 204 (here, the volume of the printed material is in one-to-one correspondence with the height or thickness as the area is assumed to be fixed for each representative amount of print material). Additionally, as shown, second color density 204 corresponds with a second volume (e.g., 50 droplets in a fixed area) of print material less than a third volume (e.g., 81 droplets in a fixed area) of print material corresponding with third color density 206. Further, as shown, third color density 206 corresponds with a third volume (e.g., 81 droplets in a fixed area) of print material less than a fourth volume (e.g., 100 droplets in a fixed area) of print material corresponding with fourth color density 208. In other embodiments, first set of color densities 201 includes different color densities.

In those instances where a color density is used, a color density may have a corresponding perceived color intensity. As used herein, a perceived color intensity may refer to a level of vividness of a color. That is, a higher perceived color intensity may appear sharper or more colorful while a lower perceived color intensity may appear washed out or less colorful. In some embodiments, a maximum perceived color intensity may result in a saturated color level. Referring to FIG. 4, fourth color density 208 may appear visually to observer 200 as having a perceived color intensity level (e.g., 99%) corresponding to approximately saturated black. As used herein, a color may be approximately saturated if the color has a perceived color intensity level of at least 99 percent of saturated. In the example, third color density 206 may also appear visually to observer 200 as having a perceived color intensity level (e.g., 99%) corresponding to approximately saturated black. That is, the additional volume of print material (i.e., higher print density) in fourth color density 208 may have little or no change in the perceived color intensity level. In the example, second color density 204 may appear visually to observer 200 as having a perceived color intensity level (e.g., 80%) corresponding to a dark gray. In the example, first color density 202 may appear visually to observer 200 as having a perceived color intensity level (e.g., 50%) corresponding to a light gray color.

In those instances where a color density is used, a color may be assigned a color density based on a comparison of a perceived color intensity at a color density with a predefined perceived color intensity. In some embodiments, the lowest color density achieving the predefined perceived color intensity is used for the color. In other embodiments, a color may be assigned a color density based on other criteria.

In those instances where a color is assigned a color density based on a comparison of a perceived color intensity at a color density with a predefined perceived color intensity, any suitable predefined perceived color intensity may be used. In some embodiments, a predefined perceived color intensity level may be approximately saturated. For example, third color density 206 may appear visually to observer 200 as having a perceived color intensity level (e.g., 99.5%) of slightly less than a perceived color intensity level (e.g., 99.9%) of fourth color density 208 and still be considered a saturated black. In other embodiments, a predefined perceived color intensity may be different.

In those instances where a color is assigned a color density based on a comparison of a perceived color intensity at a color density with a predefined perceived color intensity, any suitable sample of color densities may be used. In some embodiments, two or more color densities may be used. Referring to FIG. 4, third color density 206 and fourth color density 208 may appear visually to observer 200 as having a perceived color intensity level corresponding to approximately saturated black, which in the example is the predefined perceived color intensity. In the example, first color density 202 and second color density 204 fail to achieve the predefined perceived color intensity. In the example, third color density 206 may be selected to use less print material. That is, first color density 202 and second color density 204 may not be selected because they have perceived color intensity levels that are lower than the predefined perceived color intensity, while third color density 206 may be selected over fourth color density 208 to use less print material. In other embodiments, a different sample of color densities may be used.

Figure 5:
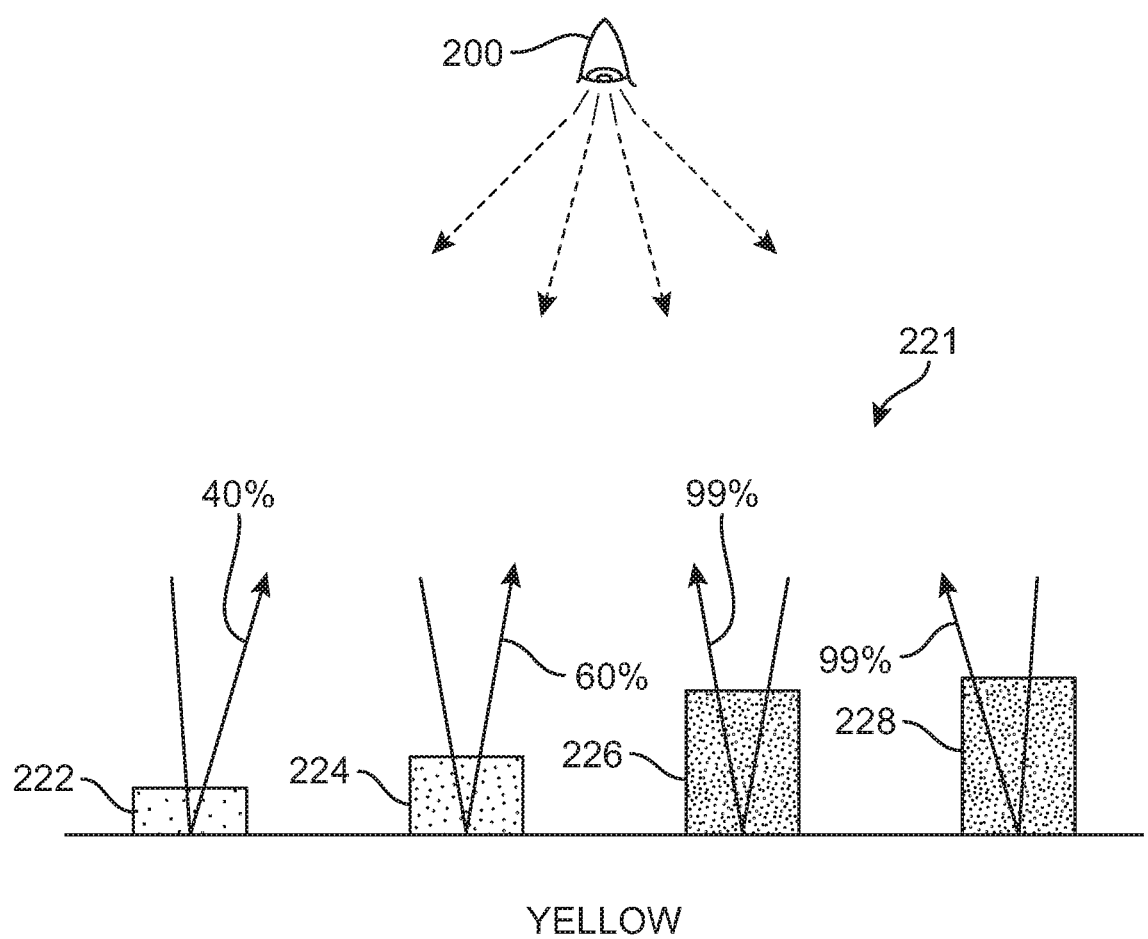
FIG. 5 shows a schematic view of a second color at various color densities, in accordance with an exemplary embodiment.

In some embodiments, different colors may achieve the same perceived color intensity at different color densities. Referring to FIG. 5, yellow may have a second set of color densities 221 that includes first color density 222, second color density 224, third color density 226, and a fourth color density 228. In the example, yellow may achieve a predefined perceived color intensity at third color density 226 (e.g. 90 droplets in a fixed area) while black may achieve the same predefined perceived color intensity at third color density 206 (e.g. 80 droplets in a fixed area). In other embodiments, different colors may achieve the same perceived color intensity at the same color density.

In those instances that include provisions for accounting for colors having different color densities, any number of colors may be assigned that are suitable color densities. In some embodiments, each color to be printed onto an article by a printing system may be assigned a color density. In other embodiments, each color of a sample of colors may be assigned a color density and some (non-sample) colors may be assigned an estimated color density based on the predefined color densities of the sample colors as described further below.

In those instances that include provisions for an estimated color density, any suitable method of determining a color density may be used. In some embodiments, a printing system may determine an estimated color density based on a similarity between two colors. For example, a first color may be formed using 40 droplets of cyan print material and 60 droplets of yellow print material and a second color assigned a color density may be formed of 50 droplets of cyan print material and 50 droplets of yellow print material. In the example, the difference in print material between the first color and the second color may be sufficiently similar such that the printing system estimates the first color and the second color as having the same color density. In other embodiments, other estimation methods may be used.

Figure 6:
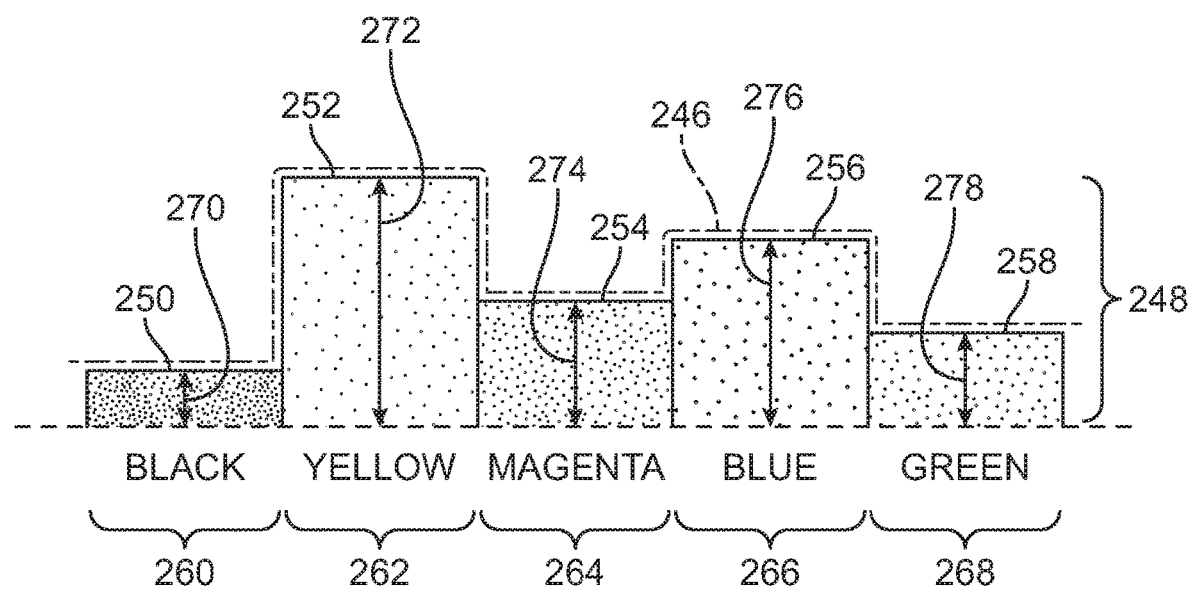
FIG. 6 shows a schematic view of various color layers printed to achieve a perceived color intensity, in accordance with an exemplary embodiment.

Some embodiments of printing system 100 can include provisions that permit a region of a three-dimensional object to have a color layer. Referring to FIG. 6, first color layer 250 may be printed in first region 260. In other embodiments, a color layer may be omitted.

In those instances where a color layer is used, the color layer may be formed of any suitable print material. In some embodiments, a color layer includes one or more pigments. For example, a color layer may include one or more of the pigments CMYK. In some embodiments, a color layer may include a structural print material. For example, a color layer may include a clear and/or transparent structure print material. In other embodiments, the color layer may be formed of different materials.

In those instances where a color layer is used, any suitable number of color layers may be used to form a three-dimensional object. Some embodiments may include provisions that permit a region of a three-dimensional object to have a color layer independent from other color layers of other regions of the three-dimensional object. In some embodiments, each region of a three-dimensional object may be assigned a color layer. Referring to FIG. 6, first color layer 250 may be printed in first region 260, second color layer 252 in a second region 262, third color layer 254 in a third region 264, fourth color layer 256 in a fourth region 266, and fifth color layer 258 in a fifth region 268. In other embodiments, an entire three-dimensional object is assigned a color layer.

Some embodiments can include provisions for printing each color layer in a region to achieve a predefined perceived color intensity level. In some embodiments, a color density may be used to achieve a predefined perceived color intensity level. In other cases, other suitable criteria may be used to achieve a predefined perceived color intensity level.

In those instances where a color density may be used to achieve a predefined perceived color intensity level, any suitable method may be used. In some embodiments, each color layer may be printed to a corresponding color density. Referring to FIG. 6, first color layer 250 may be printed in first region 260 with a volume of print material to achieve a color density corresponding with black, second color layer 252 may be printed in second region 262 with a volume of print material to achieve a color density corresponding with yellow, third color layer 254 may be printed in third region 264 with a volume of print material to achieve a color density corresponding with magenta, fourth color layer 256 may be printed in fourth region 266 with a volume of print material to achieve a color density corresponding with blue, fifth color layer 258 may be printed in fifth region 268 with a volume of print material to achieve a color density corresponding with green. In other embodiments, each color may be printed using other criteria.

In those instances that permit color printing using a color density assigned for each color, a resulting set of color layers may have different thicknesses. Referring to FIG. 6, a resulting set of color layers 248 may include first color layer 250 having first color thickness 270, second color layer 252 having second color thickness 272, third color layer 254 having third color thickness 274, fourth color layer 256 having fourth color thickness 276, and fifth color layer 258 having fifth color thickness 278. As shown, the resulting set of color layers 248 has different thicknesses, thereby resulting in uneven surface profile 246. In other embodiments, a resulting set of color layers may have substantially similar thicknesses (not shown).

Some embodiments can include provisions that permit an exposed surface of the three-dimensional object to have a desired surface profile. In some embodiments, a region may be configured to have a target thickness. As used herein, a target thickness may refer to a combination of a color thickness for a color layer and a structural thickness for a structural layer, as described further below. In other cases, a region may be configured to have other characteristics to permit the exposed surface of the three-dimensional object to have the desired surface profile.

Figure 7:
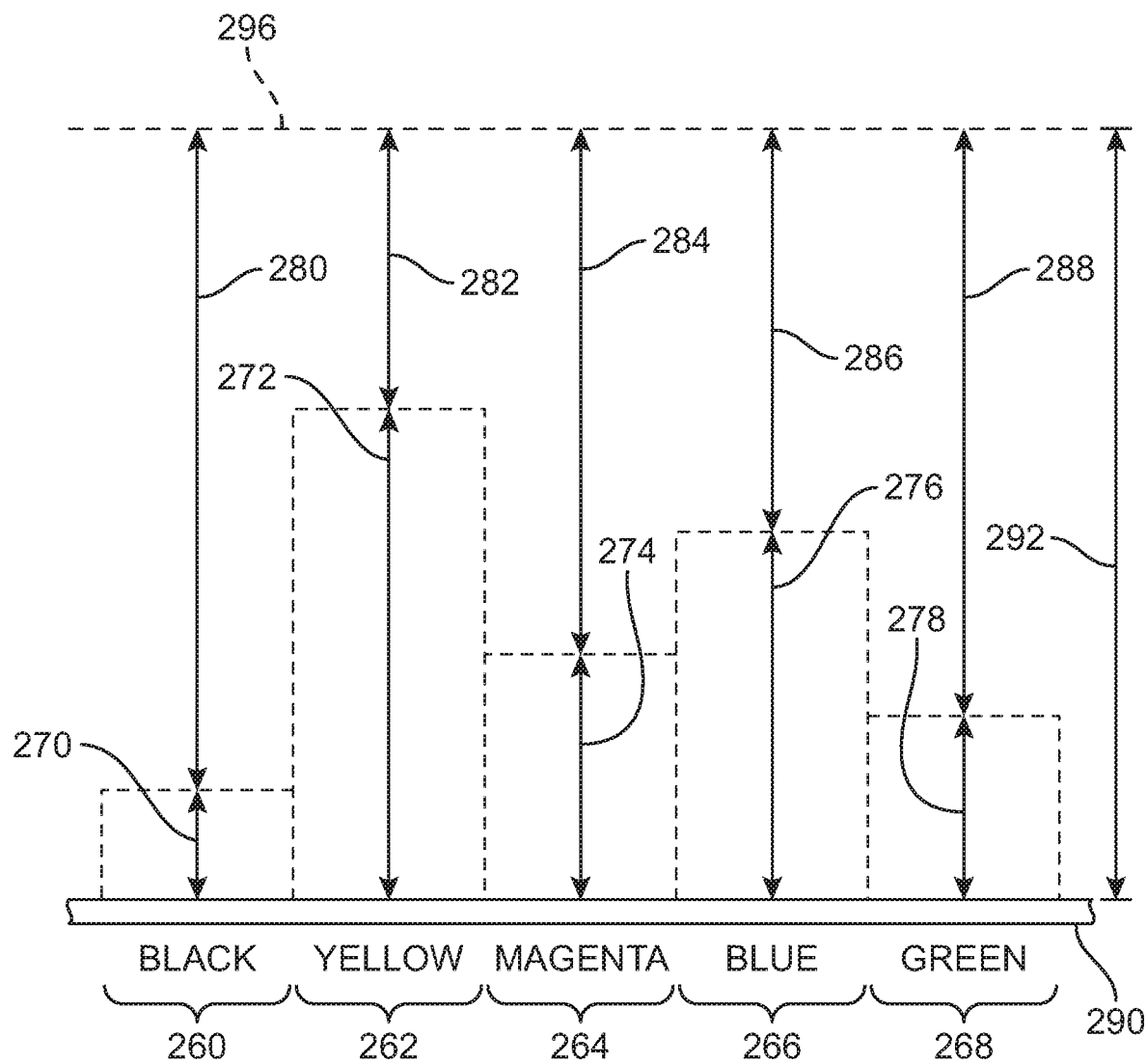
FIG. 7 shows a schematic view of determining a structural thickness from a color thickness and a target thickness, in accordance with an exemplary embodiment.

In those instances where a target thickness is used to facilitate printing a three-dimensional object to have the desired surface profile, the desired surface profile may be any suitable shape. In some embodiments, a target thickness may be constant from one location and/or region to another to provide an approximately flat top surface profile. Referring to FIG. 7, desired surface profile 296 may be approximately planar. In other embodiments, a target thickness may be varied from one location and/or region to another to provide other surface profiles. For example, the surface profile may be curved (see FIG. 17). In other examples, the surface profile may be spherical, rectangular, triangular, octagonal, conical, and the like (not shown).

In those instances where a target thickness is used, any number of target thicknesses may be used to indicate the shape of a three-dimensional object. In some embodiments, a target thickness is for the entire three-dimensional object. In another embodiment, a target thickness is for a region of the three-dimensional object.

In those instances where a target thickness is for a region of the three-dimensional object, a region may be any portion of the three-dimensional object. In some embodiments, a region includes a single color layer. For example, as shown in FIG. 7, first region 260 may be assigned target thickness 292. In other embodiments, a single region may include multiple color layers.

In some embodiments, multiple regions of a three-dimensional object may have a single target thickness. Referring to FIG. 7, a first region 260 of base 290 has a target thickness 292. In the example, second region 262 of base 290, third region 264 of base 290, fourth region 266 of base 290, and fifth region 268 of base 290 may each have the target thickness 292 as shown. In other embodiments, some of the regions may have different target thicknesses (see FIG. 17).

Some embodiments may permit printing a three-dimensional object to have a desired surface profile even when a set of color layers of the three-dimensional object have an uneven surface profile. In some embodiments, such a method may include determining a target thickness for a region, determining a color for the region, determining a color thickness for the color, and determining a structural thickness based on the target thickness and the color thickness. It should be understood that some embodiments may include additional and/or fewer steps. In other embodiments, another method may permit printing a three-dimensional object to have a desired surface profile even when a set of color layers of the three-dimensional object have an uneven surface profile.

In those instances where the method includes a step for determining a target thickness for a region, the target thickness may be determined using any suitable information, technique, or technology. In some embodiments, a human user assigns a target thickness to a region of the three-dimensional object and the target thickness is received by a printing system. In other embodiments, a computing system may calculate a target thickness and assigns the target thickness to a region of the three-dimensional object.

In those instances where the method includes a step for determining a color of a region, the color of a region may be determined using any suitable information, technique, or technology. In some embodiments, a human user assigns a color to a region of the three-dimensional object. In other embodiments, a computing system calculates a color and assigns the color to a region of the three-dimensional object.

In those instances where the method includes a step for determining a color of a region, the color may include any suitable number of pigments. In some embodiments, the color includes two or more of the pigments CMYK. For example, brown may be printed using a magenta pigment, a yellow pigment, and a black pigment (not shown). In other embodiments, a color may include a single pigment.

In those instances where a color of a region is used, a color may be assigned to any suitable number of regions. In some embodiments, a color may be assigned to a single region. Referring to FIG. 7, first region 260 may be assigned a black color. In the example, second region 262 may be assigned a yellow color, third region 264 may be assigned a magenta color, fourth region 266 may be assigned a blue color, and fifth region 268 may be assigned a green color. In other embodiments, a color may be assigned to a set of regions of a three-dimensional object.

In those instances where a color of a region is used, the color may be associated with any suitable characteristics. In some embodiments, a color may be assigned a color density. In other embodiments, a color may be associated with other characteristics.

In those instances where a color is assigned a color density, the color density may be determined by any suitable means. In some embodiments, a printing system may assign a color density to account for a perceived color intensity of a color (see FIGS. 4-6). Referring to FIG. 7, first region 260 may have a black color assigned a color density of 81 droplets. In the example, second region 262 may have a yellow color assigned a color density of 92 droplets, third region 264 may have a magenta color assigned a color density of 85 droplets, fourth region 266 may have a blue color assigned a color density of 90 droplets, and fifth region 268 may have a green color assigned a color density of 83 droplets. In other embodiments, the color density for a region may be based on other criteria.

In those instances where the method includes a step for determining a color thickness of a region based on a color density, the color thickness of the region may be determined using any suitable information, technique, or technology. In some embodiments, a color thickness for a color may be selected according to a color density, as further described below. In some embodiments, a color density may have a corresponding volume of print material, and determining the color thickness may include calculating color thickness corresponding with the volume of print material. In other embodiments, a color thickness is determined using other information.

In those instances where a color thickness for a color may be selected according to a color density, the color thickness of the region may be selected using any suitable information, technique, or technology. In some embodiments, a color density may have a corresponding color thickness, and determining the color thickness may include a look up of the color thickness corresponding with the color density. For example, first region 260 may have a first color thickness 270, second region 262 may have a second color thickness 272, third region 264 may have a third color thickness 274, fourth region 266 may have a fourth color thickness 276, and fifth region 268 may have a fifth color thickness 278. In other embodiments, a sample of color densities may have a corresponding thickness, and determining the color thickness includes estimating the color thickness based on the sample of color densities.

Some embodiments can include provisions to allow a target thickness to be independent from the color thickness. In some embodiments, adjacent regions may have different color thicknesses and the same target thickness. Referring to FIG. 7, first region 260 may be adjacent to second region 262. In the example, first color thickness 270 may be smaller than second color thickness 272 and first region 260 and second region 262 both have target thickness 292. Also, as shown in FIG. 7, second region 262 may be adjacent to third region 264. In the example, second color thickness 272 may be greater than third color thickness 274 and second region 262 and third region 264 both have target thickness 292. Further, third region 264 may be adjacent to fourth region 266. In the example, third color thickness 274 may be smaller than fourth color thickness 276 and third region 264 and fourth region 266 both may have target thickness 292. Additionally, fourth region 266 may be adjacent to fifth region 268. In the example, fourth color thickness 276 may be greater than fifth color thickness 278 and fourth region 266 and fifth region 268 both may have target thickness 292. In other embodiments, a target thickness may be dependent on the color thickness.

In embodiments where the color thickness of a region is less than the target thickness for that region, it may be necessary to provide additional printed structure to achieve the target thickness for the printed object at the region. In some embodiments, additional printed material may be provided as a structural layer over the color layer to achieve a total thickness for the object equal to the target thickness (at a given location and/or region).

In those instances where the method includes a step for determining a structural thickness based on the target thickness and the color thickness, the structural thickness of the region may be determined using any suitable information, technique, or technology. In some embodiments, the structural thickness may be a difference between the color thickness and the target thickness. For example, as shown in FIG. 7, first structural thickness 280 may be a difference between first color thickness 270 and target thickness 292. In the example, second structural thickness 282 may be a difference between second color thickness 272 and target thickness 292, third structural thickness 284 may be a difference between third color thickness 274 and target thickness 292, fourth structural thickness 286 may be a difference between fourth color thickness 276 and target thickness 292, and fifth structural thickness 288 may be a difference between fifth color thickness 278 and target thickness 292. In other embodiments, the structural thickness may be calculated using other information and/or using other methods.

FIGS. 8-13 illustrate a printing of a set of color layers for a three-dimensional object, in accordance with exemplary embodiments. In some embodiments, printing system 100 is used to print the set of color layers. In other embodiments, other printing systems may be used.

In those instances where printing system 100 is used to print a set of color layers of a three-dimensional object, any suitable hardware, technology, and protocols may be used. In some embodiments, print head assembly 140 of printing device 102 may be used to print the set of color layers. In other embodiments, other print head assemblies may be used.

In those instances where print head assembly 140 is used to print a set of color layers of a three-dimensional object, any suitable method may be used. In some embodiments, a color layer is printed by dispensing print material 302 in a liquid form. In other embodiments, other print methods are used.

Figure 8:
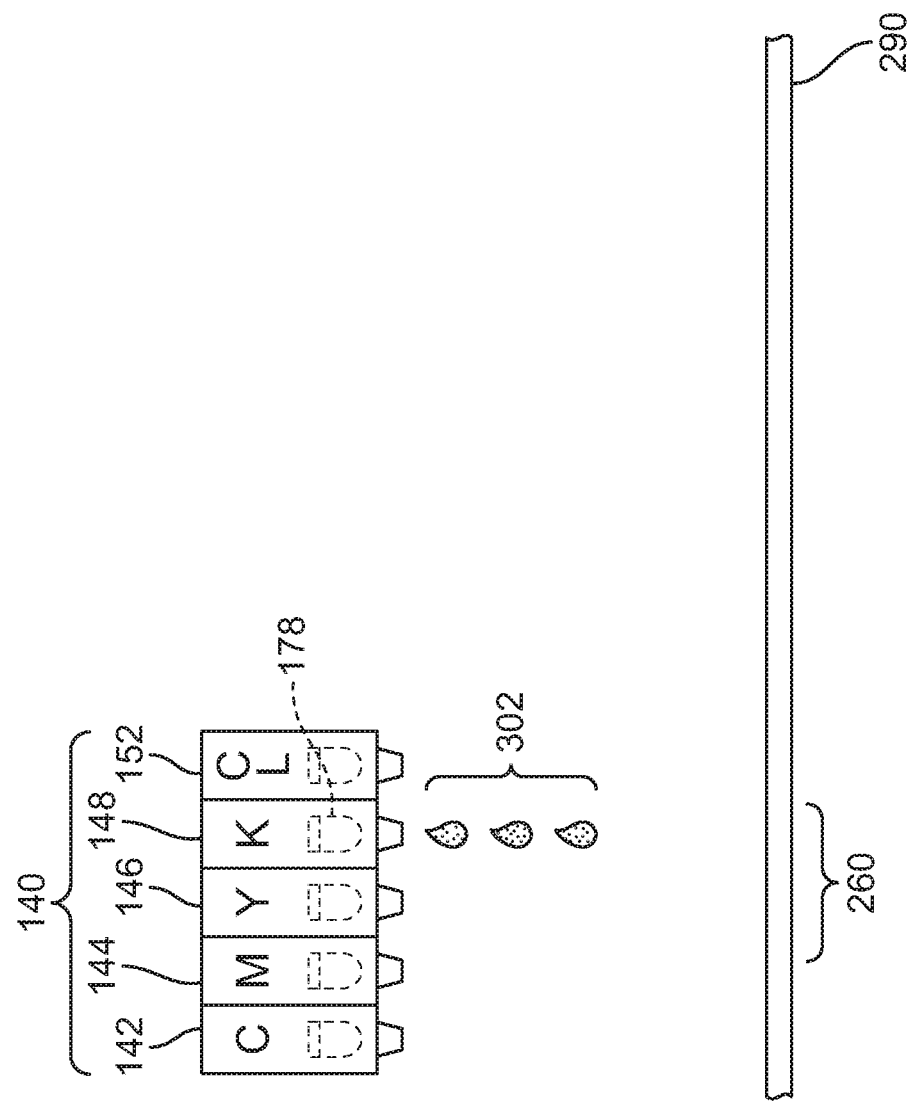
FIG. 8 shows a schematic view of dispensing a first print material onto a base for a first color layer, in accordance with an exemplary embodiment.

Some embodiments can include provisions that permit dispensing of print material from any number of print heads of the print head assembly. In some embodiments, print material may be dispensed from a single cartridge. Referring to FIG. 8, a first color layer is printed by dispensing print material 302 in a liquid form onto first region 260 of base 290. In other embodiments, print material may be dispensed from multiple cartridges to intermix print material of different cartridges (see FIG. 10).

Some embodiments can include provisions that permit any print material to be dispensed from the print head assembly. In some embodiments, the print material is light curable. In some embodiments, the print material is ultraviolet light curable. In other embodiments, the print material is curable by other methods.

In those instances where print material dispensed from a print head assembly is ultraviolet curable, any suitable method may be used to cure the print material. In some embodiments, a printing system may be provisioned to include a cure lamp. In other embodiments, a printing system may be provisioned to include other devices configured to cure an ultraviolet curable print material.

Figure 9:
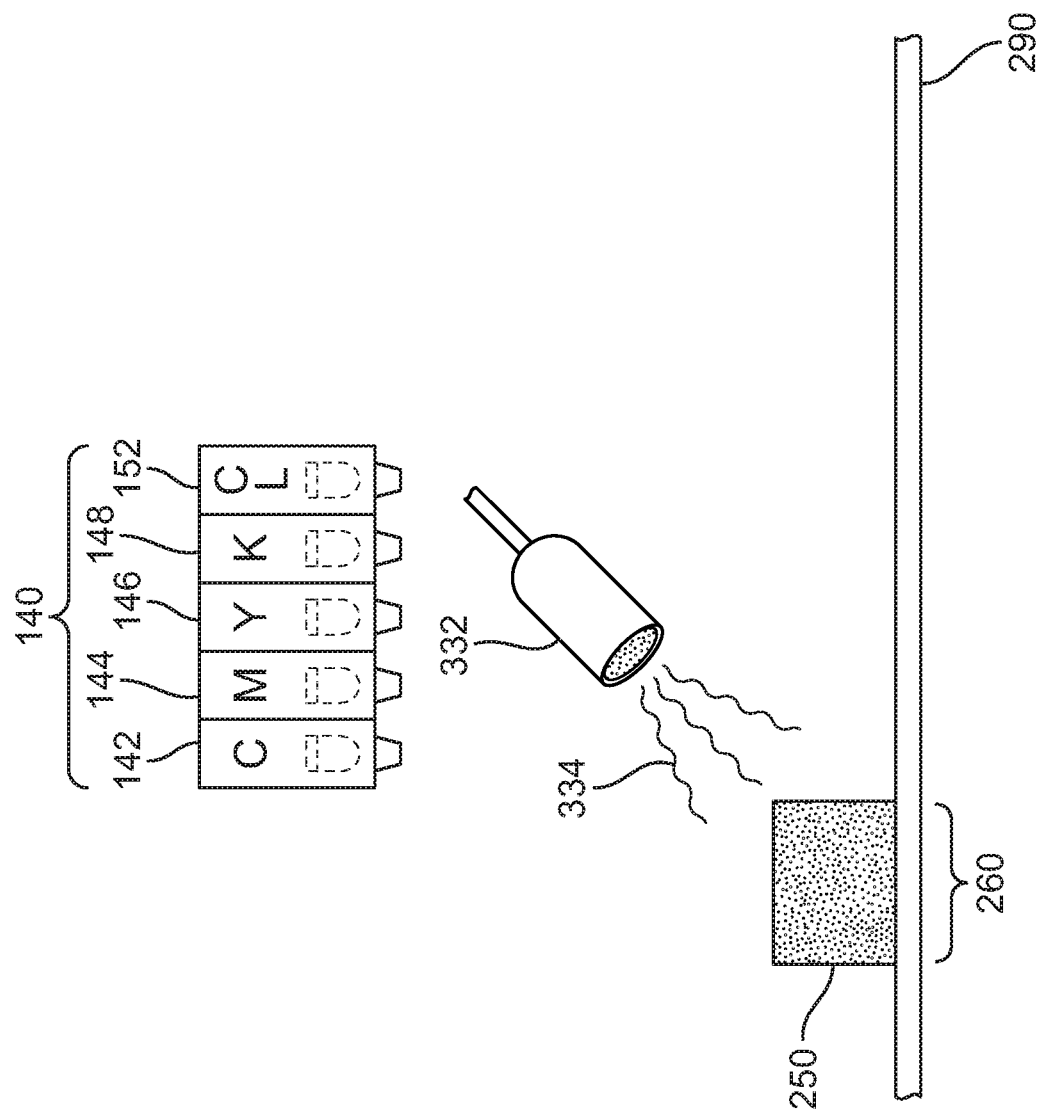
FIG. 9 shows a schematic view of curing the first print material on the base of FIG. 8 to form the first color layer, in accordance with an exemplary embodiment.

In those instances where a printing system may be provisioned to include a curing device, the curing device may emit any suitable light to cure print material. In some embodiments, the curing device emits ultraviolet light. Referring to FIG. 9, curing device 332 emits ultraviolet light 334 toward first region 260 of the base 290 to cure the first color layer 250.

In some embodiments, the curing device may be provisioned to cure print material to transition any amount of the print material from a liquid state to a solid state. In some embodiments, the curing device may be provisioned to cure all print material dispensed onto a region of a base to transition the print material from a liquid state to a solid state. In other embodiments, the curing device may be provisioned to cure only a portion of a print material dispensed onto a region of a base to transition the print material from a liquid state to a solid state.

Figure 10:
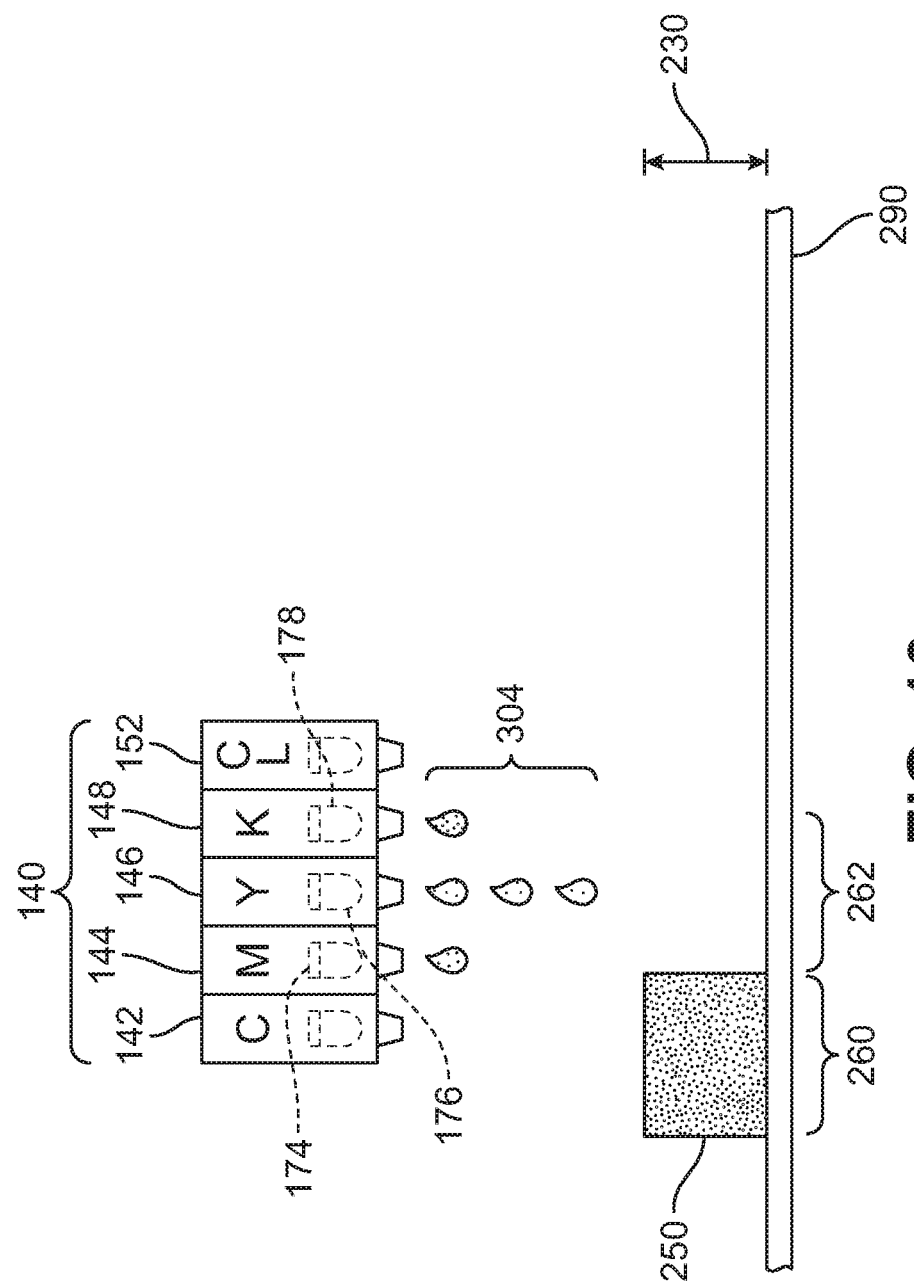
FIG. 10 shows a schematic view of dispensing a second print material onto the base of FIG. 8 for a second color layer, in accordance with an exemplary embodiment.

Some embodiments can include provisions that permit dispensing of print material from multiple cartridges of the print head assembly. Referring to FIG. 10, a second color layer may be printed by dispensing print material 304 onto second region 262. In the example, print material 304 may include magenta print material 174 from cartridge 144, yellow print material 176 from cartridge 146, and black print material 178 from cartridge 148. In some embodiments, the second color layer may be printed using other print material from other print cartridges. In other embodiments, print material may be dispensed from a single cartridge (see FIG. 8).

Some embodiments can include provisions that permit intermixing of print material from multiple cartridges of the print head assembly. In some embodiments, the print material is intermixed above the base. Referring to FIG. 10, print material 304 may be intermixed before contacting first region 260 of base 290. In some embodiments, the print material is intermixed on the base. Referring to FIG. 10, print material 304 may be intermixed after contacting first region 260 of base 290. In various embodiments, the print material may be intermixed above base 290. In some embodiments, the print material may be intermixed directly on the base 290. In other embodiments, the print material 304 may not intermix.

In those instances where a printing system may be provisioned to intermix print material, a curing device may cure the print material at any suitable time. In some embodiments, the curing device cures the print material after the print material intermixes. For example, curing device 332 (see FIG. 9) may cure print material 302 after print material 302 intermixes. In the example, curing device 332 may cure print material 304 after print material 304 intermixes (not shown). In some embodiments, the curing device cures the print material after a reshaping step. In other embodiments, the curing device cures the print material at other times.

In some embodiments, a set of color layers are printed using a set of print head passes to form a three-dimensional object. In some embodiments, multiple regions are printed on during a single pass. In other embodiments, a single region is printed on during a single pass.

In those instances where multiple regions are printed on during a single pass, any suitable method may be used. In some embodiments, each region of the multiple regions is printed to a single height. Referring to FIG. 10, first region 260 is printed to single pass height 230. In other embodiments, each region may be printed to a height independent to the other regions.

Figure 11:
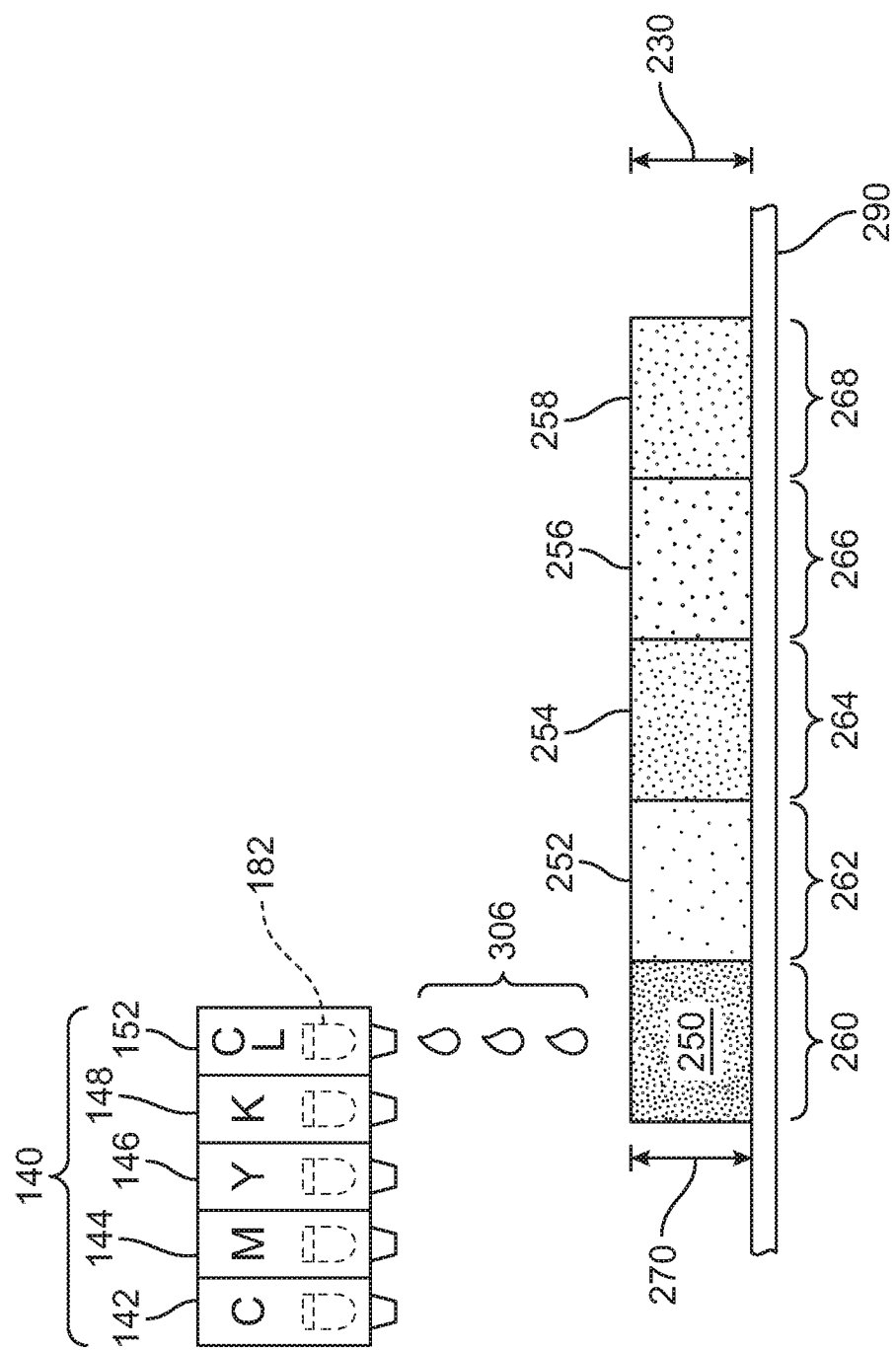
FIG. 11 shows a schematic view of dispensing a structural print material onto a first color layer to form a structural layer, in accordance with an exemplary embodiment.

Some embodiments can include provisions to control a print material dispensed onto each region during a pass to allow each region of a three-dimensional object to have different colors in different regions. In some embodiments, a print head assembly dispenses print material onto a region based on a color assigned. Referring to FIG. 11, print head assembly 140 may dispense print material to form a portion of the third color layer 254 having a magenta color. In the example, print head assembly 140 may dispense print material to form a portion of fourth color layer 256 having a blue color. Further, in the example, print head assembly 140 may dispense print material to form a portion of fifth color layer 258 having a green color. In other embodiment, print head assembly 140 may dispense print material onto a region based on other criteria.

Some embodiments can include provisions to control a print material dispensed during each pass of a print head assembly to allow a three-dimensional object to have multiple types of layers at a single region. In some embodiments, a print head assembly dispenses print material for a color layer based on a color thickness of the color layer. Referring to FIG. 11, a first pass may form the first color layer 250 with first color thickness 270. In the example, print material 306 may include clear print material 182 from cartridge 152, which may differ from print material 304. In other embodiments, a print head assembly dispenses print material for a color layer based on other criteria.

Figure 12:
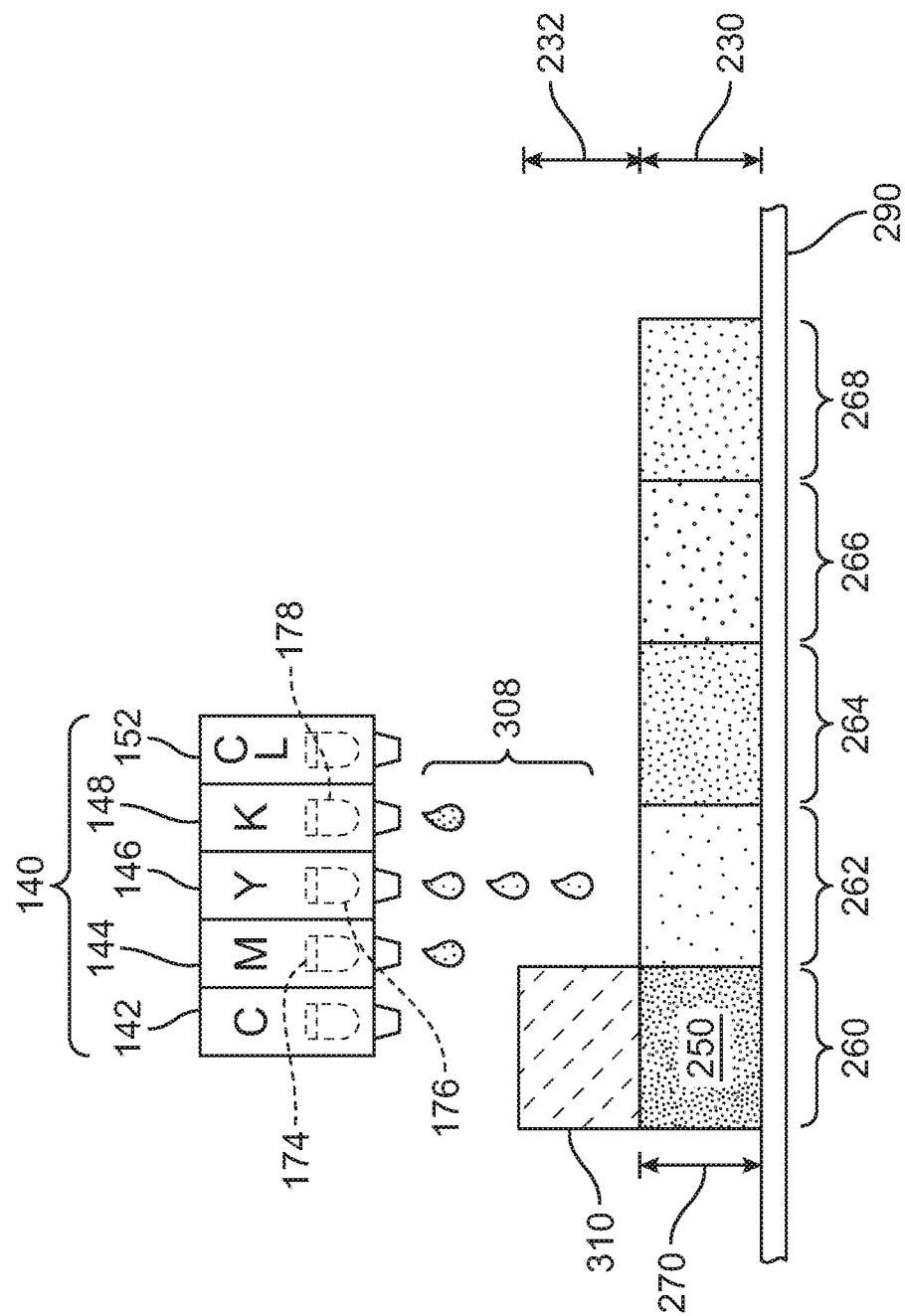
FIG. 12 shows a schematic view of dispensing the second print material of FIG. 10 onto a first portion of the second color layer to form a second portion of the second color layer, in accordance with an exemplary embodiment.

Some embodiments can include provisions to control the height of each pass of a print head assembly. In some embodiments, each pass of a print head assembly dispenses print material for a unitized thickness. Referring to FIGS. 11-12, print head assembly 140 dispenses print material 306 to form a portion of structural layer 310 to height 232 which may be equal to single pass height 230. In other embodiments, passes of a print head assembly dispenses print material for different thicknesses (not shown).

Some embodiments can include provisions to dispense a portion of a color layer and/or a portion of a structural layer during a pass of the print head assembly. In some embodiments, the print head assembly dispenses a portion of a color layer and a portion of a structural layer during a single pass of the print head assembly. Referring to FIGS. 11-12, print head assembly 140 of printing device 102 may dispense print material 306 for a portion of structural layer 310 over first region 260 as well as dispense print material 308 for a portion of second color layer 252 over second region 262. In other embodiments, the print head assembly may dispense a portion of a color layer during one pass of the print head assembly and a portion of a structural layer during a different pass of the print head assembly (not shown).

Figure 13:
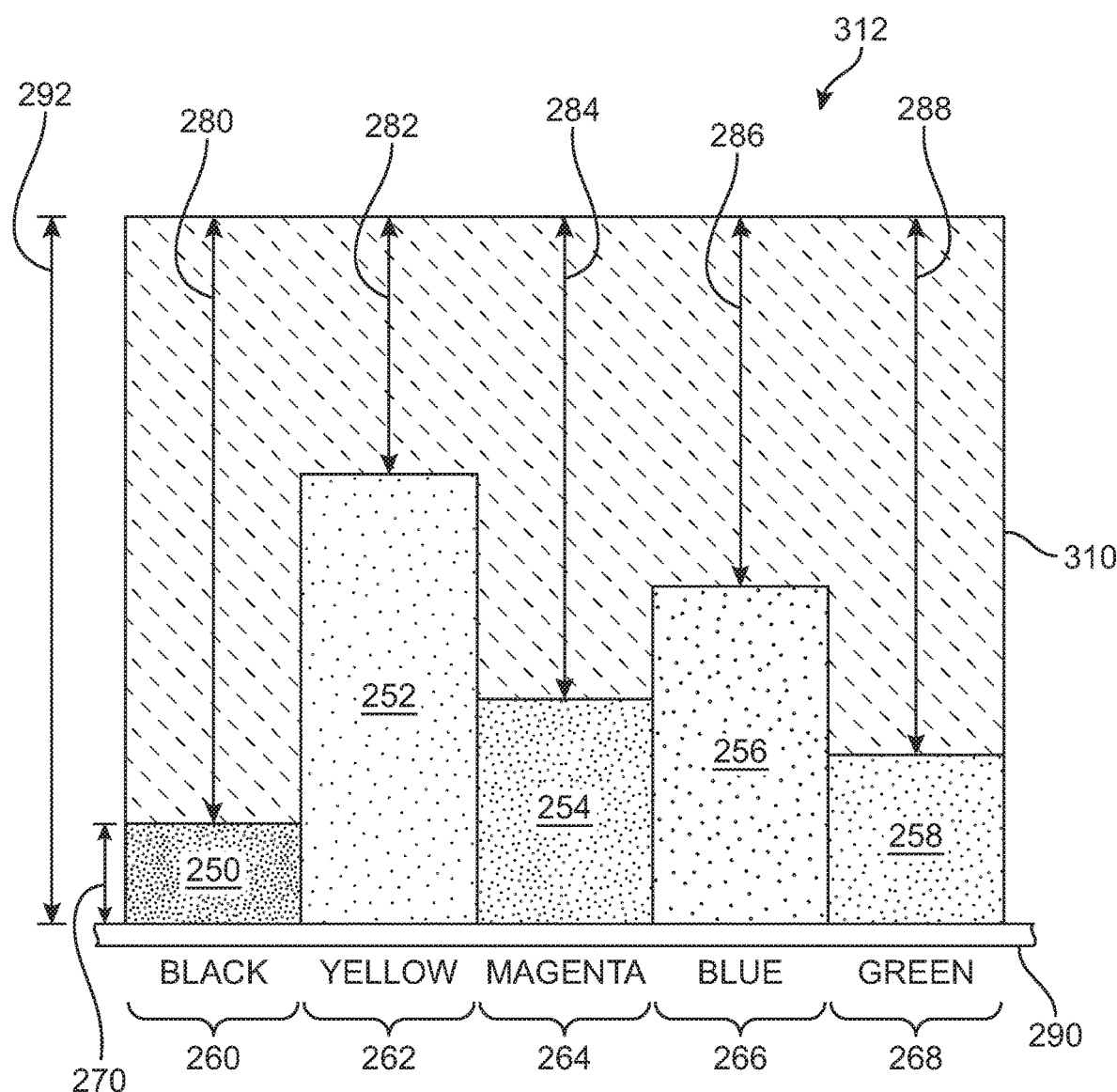
FIG. 13 shows a schematic view of a three-dimensional object having a substantially planar exposed surface, in accordance with an exemplary embodiment.

Some embodiments can include provisions to print a color layer having a color thickness in a region using any suitable number of passes of the print head assembly. In some embodiments, the print head assembly dispenses a color layer during a single pass of the print head assembly. Referring to FIG. 13, first color layer 250 may be formed using a single pass of print head assembly 140. In other embodiments, the print head assembly dispenses a color layer during multiple passes of the print head assembly. Referring to FIG. 13, second color layer 252 may be formed using multiple passes of print head assembly 140. In the example, third color layer 254 may be formed using multiple passes of print head assembly 140. Further, fourth color layer 256 may be formed using multiple passes of print head assembly 140. Additionally, fifth color layer 258 may be formed using multiple passes of print head assembly 140.

Some embodiments can include provisions to form a structural thickness of a structural layer in a region to achieve a target thickness for a three-dimensional object. In some embodiments, a combination of a color layer and a structural thickness can be equal to target thickness. Referring to FIG. 13, structural layer 310 may have first structural thickness 280 in the first region 260 and first color thickness 270 so that the combined thickness of both layers is equal to target thickness 292. In other embodiments, a target thickness for a three-dimensional object may be achieved using other methods.

Some embodiments allow for a first structural layer of a three-dimensional object and a second structural layer of a three-dimensional object to have different structural thicknesses. Referring to FIG. 13, the structural layer 310 has a first structural thickness 280 in the first region 260 different than second structural thickness 282 in the second region 262. In the example, the structural layer 310 has third structural thickness 284 in the third region 264, fourth structural thickness 286 in fourth region 266, and fifth structural thickness 288 in fifth region 268, which each have different thicknesses. In other embodiments, structural thicknesses of a three-dimensional object may be equal.

Some embodiments can include provisions to allow adjacent regions of the three-dimensional object to have different structural thicknesses. Referring to FIG. 13, first region 260 of the three-dimensional object 312 may be adjacent to second region 262. In the example, first region 260 may have first structural thickness 280, which is greater than second structural thickness 282 of second region 262. Moreover, as shown in FIG. 13, second region 262 of the three-dimensional object 312 may be adjacent to third region 264 having third structural thickness 284, which is less than second structural thickness 282. In other embodiments, adjacent regions of a three-dimensional object may have equal structural thicknesses.

Figure 14:
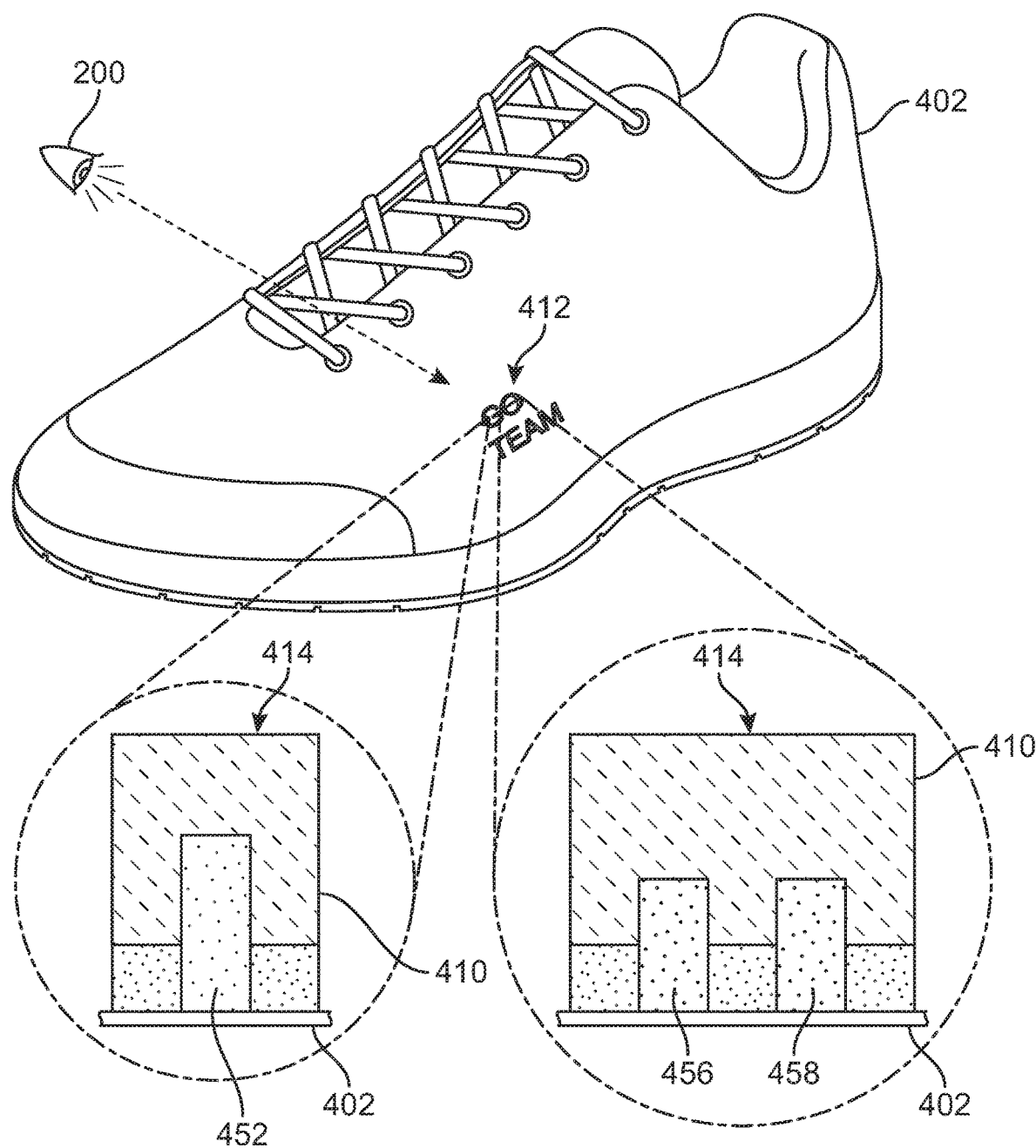
FIG. 14 shows a schematic view of an article of footwear with a three-dimensional object having a substantially planar exposed surface, in accordance with an exemplary embodiment.

The various embodiments described above may be used to print three-dimensional objects onto various objects to achieve both a functional purpose and/or aesthetic purpose. For example, as shown in FIG. 14, three-dimensional object 412 may be printed directly onto article of footwear 402 such that to observer 200 the three-dimensional object 412 forms the letter "G" in yellow with first color layer 452 and forms the letter "O" in blue with second color layer 456 and third color layer 458, thereby achieving an aesthetic purpose of a multicolor text. In the example, three-dimensional object 412 includes a structural layer 410 having different structural thicknesses over the first color layer 452 and the second color layer 456 such that three-dimensional object 412 has flat exposed surface 414 that is resistant to a collection of debris on the article of footwear 402, thereby achieving a functional purpose.

Figure 15:
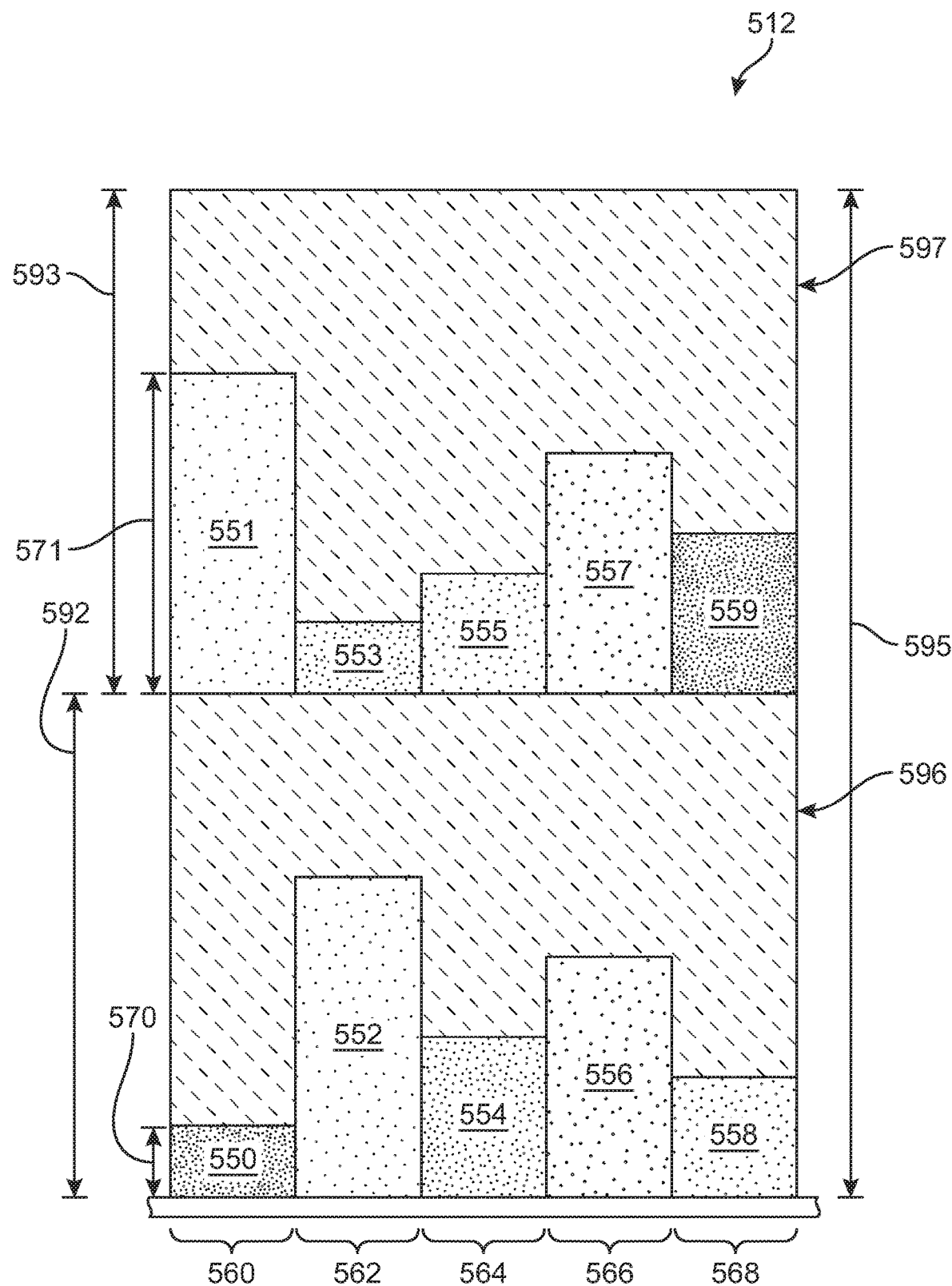
FIG. 15 shows a schematic view of a three-dimensional object having multiple pairs of color layers and structural layers, in accordance with an exemplary embodiment.

In some embodiments, a three-dimensional object may have any number of color-structural pairs. As used herein, a color-structural pair may refer to a color layer and corresponding structural layer that are formed to a target thickness. In some embodiments, a color-structural pair may refer to a set of color layers and one or more structural layers that form to a desired surface profile of an exposed layer of a three-dimensional object or to an interior layer of the three-dimensional object, as described further below. For example, as shown in FIG. 15, three-dimensional object 512 may include first color-structural pair 596 and second color-structural pair 597. In other examples, only one color-structural pair may be used (see FIG. 13). In further examples, the three-dimensional object may have more than two color-structural pairs.

In some embodiments, color-structural pairs may have the same target thickness at a region. For example, as shown in FIG. 15, first target thickness 592 is equal to second target thickness 593, thereby resulting in a combined height 595. In other embodiments, the first target thickness and the second target thickness may be different.

In those instances where color-structural pairs are used, a color-structural pair may have any suitable thickness. In some embodiments, a target thickness of a color-structural pair may be associated with a unitized block thickness for a three-dimensional object. In some embodiments, a unitized block may be selected based on design criteria. For example, first target thickness 592 may be selected by a human user for an aesthetic effect. In some embodiments, a unitized block thickness may be selected based on production criteria. For example, first target thickness 592 may be selected by a human user to improve a printing speed. In some embodiments, a target thickness of a color-structural pair may be associated with a final structural thickness for a three-dimensional object (see FIG. 14). In other embodiments, a color-structural pair may have a different thickness.

In some embodiments, a region of a three-dimensional object may have a lower color layer having a first thickness and an upper color layer having a second thickness to allow for aesthetic effects. In such embodiments, the upper color layer and one or more structural layers may be substantially transparent to permit an observer to see the lower color layer. For example, as shown in FIG. 15, first lower color layer 550 for first region 560 has a first lower color thickness 570 that is different than first upper color thickness 571 of the first upper color layer 551. In the example, first lower color layer 550 may be black while first upper color layer 551 may be yellow. That is, an observer may perceive first region 560 as a combination of black and yellow pigments or warm black. Similarly, second lower color layer 552 for second region 562 has a color thickness that is different than a color thickness of the second upper color layer 553. The third lower color layer 554 for third region 564 has a color thickness that is different than a color thickness of the third upper color layer 555. Also, fourth lower color layer 556 for fourth region 566 has a color thickness that is different than a color thickness of the fourth upper color layer. Further, fifth lower color layer 558 for fifth region 568 has a color thickness that is different than a color thickness of the fifth upper color layer 559. In other embodiments, a region of a three-dimensional object may have a lower color layer having a first thickness and an upper color layer having the same first thickness. For example, an upper color layer and a lower color layer may have the same color.

Figure 16:
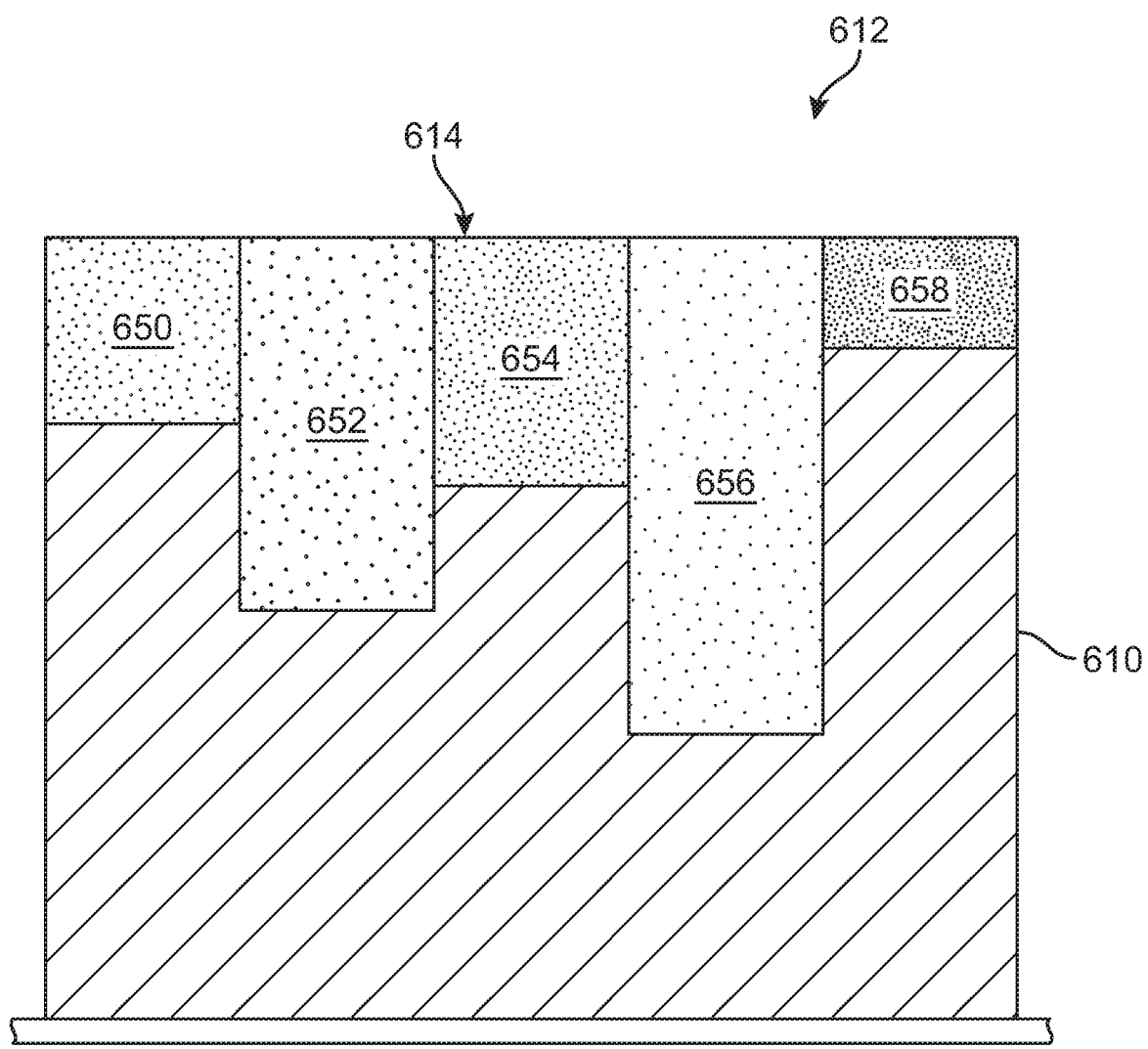
FIG. 16 shows a schematic view of a three-dimensional object having color layers disposed over a white structural layer and having a substantially planar exposed surface, in accordance with an exemplary embodiment.

In some embodiments, the structural layer may have various color transparency characteristics. For example, as shown in FIG. 16, the structural layer 610 may be opaque. In other embodiments, the structural layer may be transparent (see FIGS. 13 and 15). In some embodiments, the structural layer may be translucent (not shown). In some embodiments, the structural layer may include a combination of transparent and opaque portions (not shown). Similarly, the structural layer may include one or more pigments. For example, in FIG. 16, structural layer 610 may be white. In another example, a structural layer may be black (not shown).

It should be understood that the exposed surface of a three-dimensional object may be formed of various layers of the three-dimensional object. In some embodiments, an exposed surface of a three-dimensional object may be formed by color layers of the three-dimensional object. For example, as shown in FIG. 16, the exposed surface 614 of three-dimensional object 612 is formed of first color layer 650, second color layer 652, third color layer 654, fourth color layer 656, and fifth color layer 658. In the example, a thickness in the structural layer 610 is varied to account for the varying thickness of the first color layer 650, second color layer 652, third color layer 654, fourth color layer 656, and fifth color layer 658 such that exposed surface 614 is controlled independently from color thickness. In other embodiments, an exposed surface of a three-dimensional object may be formed by structural layers of the three-dimensional object (see FIG. 13). In further embodiments, an exposed surface of a three-dimensional object may be formed by both color layers of the three-dimensional object and by structural layers of the three-dimensional object (not shown).

Figure 17:
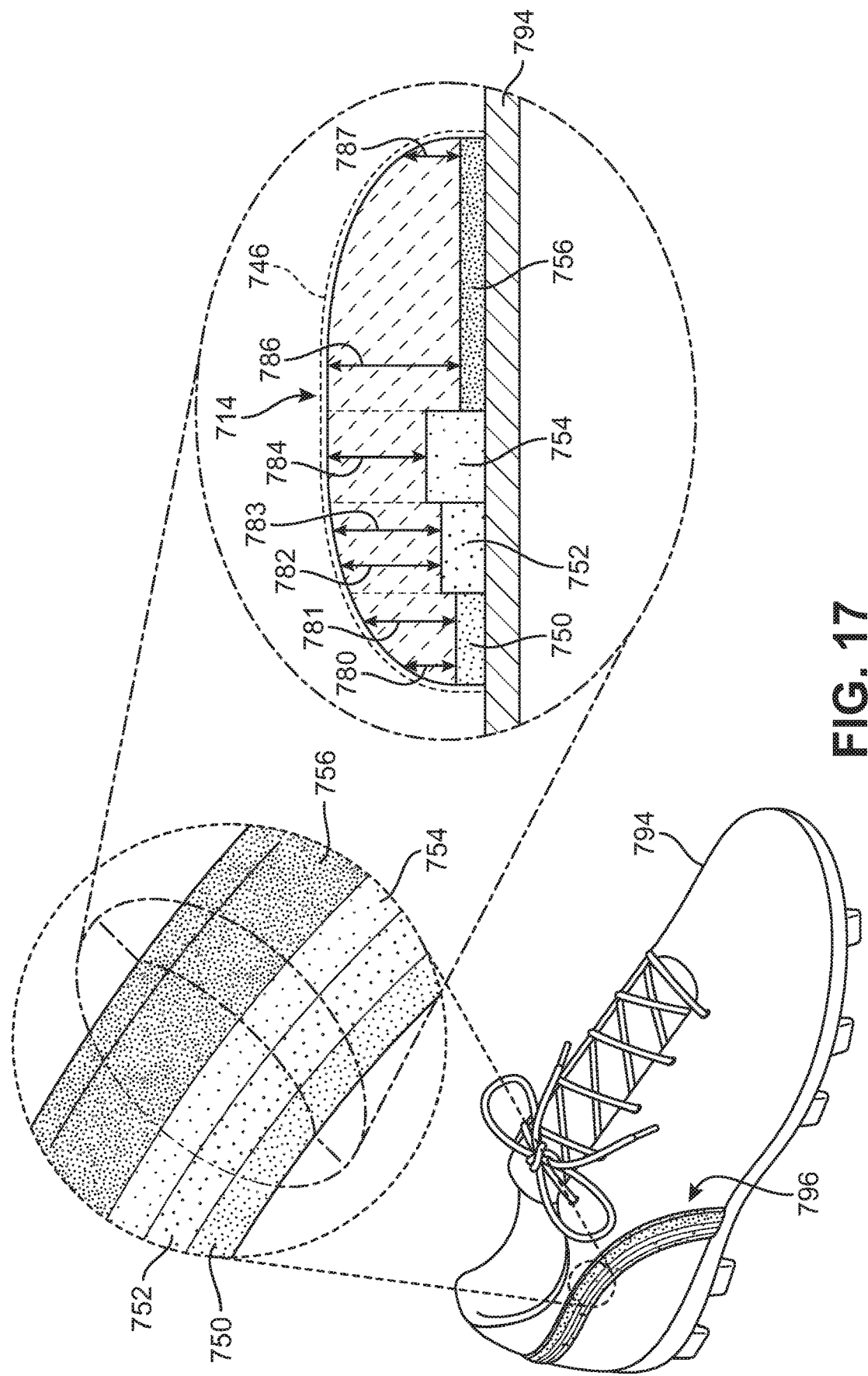
FIG. 17 shows a schematic view of an article of footwear with a three-dimensional object having an exposed surface with a surface profile independent from a surface profile of underlying color layers, in accordance with an exemplary embodiment.

In some embodiments, the target thickness of a three-dimensional object may be varied to allow an exposed surface to have any suitable surface profile. In some embodiments, the target thickness is varied to form an exposed surface having a non-linear surface profile. For example, as shown in FIG. 17, an article of footwear 794 may include a three-dimensional object 796 having exposed surface 714. In the example, the exposed surface 714 has rounded surface profile 746. In other examples, the exposed surface may have other surface profiles.

In some embodiments, a color layer may be assigned any number of target thicknesses to allow for any suitable surface profile. In some embodiments, a single color layer may have a multiple number of target thicknesses to allow for any suitable surface profile. For example, as shown in FIG. 17, first color layer 750 is assigned a first edge target thickness 780 that is less than first middle target thickness 781 to allow for rounded surface profile 746. In another example, fourth color layer 756 is assigned a fourth edge target thickness 786 that is less than fourth middle target thickness 787 to allow for rounded surface profile 746. In yet another example, second color layer 752 includes second edge target thickness 782 that is less than second middle target thickness 783 to allow for rounded surface profile 746. In other embodiments, a color layer thickness is assigned to a single target thickness. For example, as shown in FIG. 17, third color layer 754 may include third edge thickness 784.

The various steps of embodiments described above may be implemented on a print controller and/or a printing device. In some embodiments, a print controller may be responsible for determining the color layer thickness and/or the color density. In other embodiments (not shown), the print controller may provide a color and region of a three-dimensional object, and the printing device could determine the color layer and/or the color density. In some embodiments, a print controller may determine a structural thickness (see FIG. 18). In other embodiments, a printing device may determine a structural thickness (see FIG. 19).

In those instances where a print controller determines a structural thickness, any suitable device, protocol, or format may be used to facilitate a determination of a structural thickness. In some embodiments, print controller 802 (see FIG. 18) may include one or more features of computing device 104 (see FIG. 1). In other embodiments, print controller 802 and computing device 104 may be different. In some embodiments, printing device 804 (see FIG. 18) may include one or more features of printing device 102 (see FIG. 1). In other embodiments, printing device 804 and printing device 102 are different.

Figure 18:
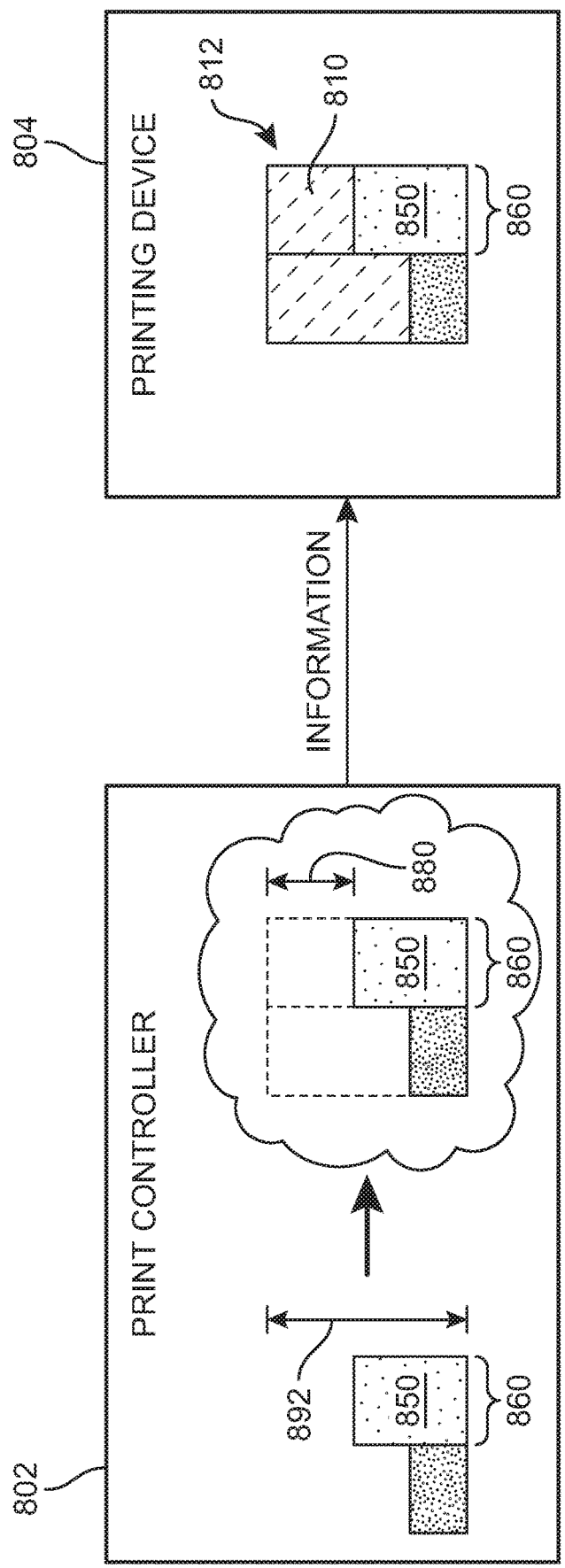
FIG. 18 shows a schematic view of a system including a print controller configured to transmit thickness print instructions indicating a structural thickness for a structural layer and a printing device configured to selectively print structural layers having the structural thickness.

In those instances where a print controller determines a structural thickness, any suitable method may be used to facilitate a determination of a structural thickness. In some embodiments, the print controller may determine a structural thickness for the structural layer based on a color layer and target thickness. For example, as shown in FIG. 18, print controller 802 may determine structural thickness 880 for structural layer 810 in the first region 860 based on color layer 850 and target thickness 892. In the example, print controller 802 may transmit information about structural thickness 880 to printing device 804, which prints three-dimensional structural component 812 using structural thickness 880. In other embodiments, the print controller 802 may use other methods to determine a structural thickness.

In those instances where a printing device determines a structural thickness, any suitable device, protocol, or format may be used to facilitate a determination of a structural thickness. In some embodiments, print controller 803 (see FIG. 19) may include one or more features of computing device 104. In other embodiments, print controller 803 and computing device 104 may be different. In some embodiments, printing device 805 may include one or more features of printing device 102. In other embodiments, printing device 805 and printing device 102 are different.

Figure 19:
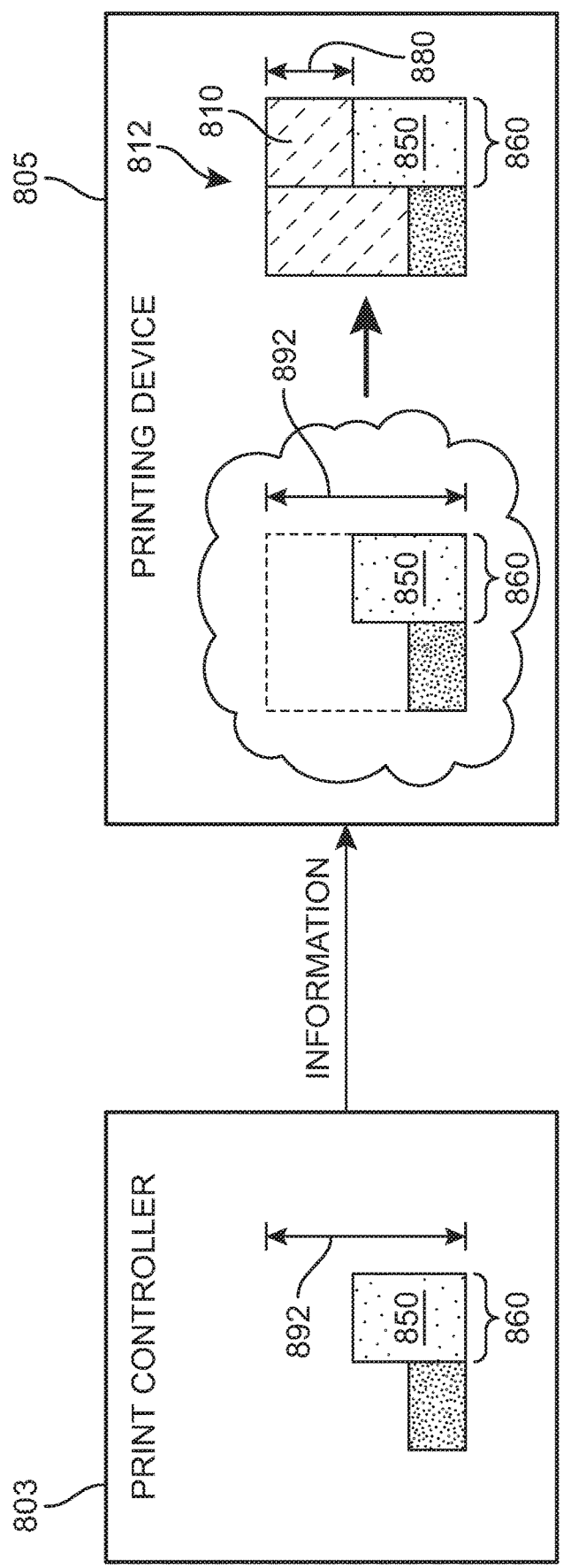
FIG. 19 shows a schematic view of a system including a print controller configured to transmit print instructions indicating a target thickness for a three-dimensional object and a printing device configured to selectively print the three-dimensional object having the target thickness.

In those instances where a print controller determines a structural thickness, any suitable method may be used to facilitate a determination of a structural thickness. In some embodiments, the printing device may determine a structural thickness for the structural layer based on a color layer and target thickness. For example, as shown in FIG. 19, print controller 803 transmits information about target thickness 892 to the printing device 805. In the example, printing device 805 determines structural thickness 880 for structural layer 810 in the first region 860 based on color layer 850 and target thickness 892 and prints three-dimensional structural component 812 using structural thickness 880. In other embodiments, the printing device 805 may use other methods to determine a structural thickness.

Some embodiments can include provisions that permit a print controller to prepare color print instructions for printing a three-dimensional object. In some embodiments, the print controller may prepare color print instructions based on a color for each pixel of a set of pixels. Referring to FIG. 18, print controller 802 may prepare color print instructions based on a color for each pixel of a set of pixels. Referring to FIG. 19, print controller 803 may prepare color print instructions based on a color for each pixel of a set of pixels. In other embodiments, the print controller prepares color print instructions based on other criteria.

In those instances where color print instructions are used, any suitable transmission protocol, equipment, and technique may be used to facilitate a transmission of those instructions. In some embodiments, color print instructions may be transmitted using network (see FIG. 1). In other embodiments, color print instructions may be transmitted differently.

In those instances where color print instructions may be transmitted using a network, a print controller may be spaced apart from a printing device by any suitable distance. In some embodiments, a print controller may be geographically remote to a printing device. Referring to FIG. 18, print controller 802 and printing device 804 may be in different buildings. Referring to FIG. 19, print controller 803 and printing device 805 may be in different cities. In other embodiments, a print controller and printing device may be geographically proximate.

In those instances where color print instructions are used, any suitable protocol, format, or method may be used to facilitate those instructions. In some embodiments, color print instructions may include a structural thickness (see FIG. 18). In some embodiments, color print instructions may include a target thickness (see FIG. 19). In some embodiments, color print instructions may include a color for each region of a set of regions. In some embodiments, color print instructions may include a color for each pixel of a set of pixels. In other embodiments, color print instructions may include other information.

In those instances where the color print instructions include a color for each region of a set of regions, any suitable protocol, method, and format may be used to determine the color for each region of a set of regions. In some embodiments, a human user selects the color for each pixel of the set of pixels using viewing interface 186 and input devices 187 and the print controller determines a color for each region of a set of regions according to the color for each pixel of the set of pixels (see FIG. 1). Referring to FIG. 18, print controller 802 may determine a color for each region of a set of regions according to the color for each pixel of the set of pixels. Referring to FIG. 19, print controller 803 may determine a color for each region of a set of regions according to the color for each pixel of the set of pixels. In other embodiments, the color for each region of a set of regions may be determined by other protocols, methods, and/or formats.

Some embodiments can include provisions that permit a printing device to designate each region of a set of regions with a color of a corresponding pixel of a set of pixels. In some embodiments, the color print instructions may include a color for each region of a set of regions. In other embodiments, the color print instructions may include a color for each pixel of a set of pixels.

In those instances where the color print instructions include a color for each region of a set of regions, any suitable method may be used to designate each region of a set of regions with a color of a corresponding pixel of a set of pixels. In some embodiments, the printing device designates each region of a set of regions according to the color print instructions. Referring to FIG. 18, printing device 804 may designate each region of a set of regions according to the color print instructions. In other embodiments, the printing device designates each region of a set of regions according to other criteria.

In those instances where the color print instructions may include a color for each pixel of the set of pixels, any suitable method may be used to designate each region of a set of regions with a color of a corresponding pixel of a set of pixels. In some embodiments, the printing device may designate each region of a set of regions with a color of a corresponding pixel of a set of pixels based on color print instructions. Referring to FIG. 19, printing device 805 may designate each region of a set of regions with a color of a corresponding pixel of a set of pixels based on color print instructions. In other embodiments, the printing device may designate each region of a set of regions with a color of a corresponding pixel of a set of pixels based on other criteria.

While various embodiments have been described, the description is intended to be exemplary, rather than limiting, and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

What is claimed is:

1. A method of printing a three-dimensional object using a printing device, the method comprising:
    determining a target thickness for a region of the three-dimensional object;
    selecting a color for the region, the color being assigned a color density;
    determining a color thickness for the color based on the color density, wherein the color thickness is less than the target thickness;
    printing a color layer having the color thickness in the region; and
    printing a structural layer having a structural thickness directly onto the color layer, wherein a combination of the color layer and the structural layer form the target thickness.

2. The method of claim 1, wherein the color density is a lowest color density to achieve a selected color intensity of the color within the region, and wherein the lowest color density corresponds to a minimum volume of printed material to achieve the selected color intensity within the region.

3. The method of claim 1, wherein after printing the color layer and prior to printing the structural layer, the method further comprises at least partially curing the color layer.

4. The method of claim 1, wherein after printing the structural layer, the method further comprises at least partially curing the structural layer.

5. The method of claim 1, further comprising at least partially curing the color layer and the structural layer.

6. The method of claim 5, further comprising reshaping the three-dimensional object after at least partially curing the color layer and the structural layer.

7. The method of claim 6, wherein after reshaping the three-dimensional object, the method further comprises fully curing the color layer and the structural layer.

8. The method of claim 7, wherein the color layer is formed by one or more first print materials, wherein the structural layer is formed by one or more second print materials, wherein the first and second print materials are ultraviolet light curable, and wherein the curing occurs when the first and second print materials are exposed to ultraviolet light.

9. The method of claim 1, wherein the color layer comprises a print material that forms the color, and wherein the print material includes a plurality of pigments.

10. The method of claim 1, further comprising calculating an amount of print material sufficient to print the color layer in the region according to the color density, wherein printing the color layer prints the amount of the print material in the region.

11. The method of claim 1, wherein prior to printing the structural layer the method further comprises determining the structural thickness by calculating a difference between the target thickness and the color thickness.

12. The method of claim 1, wherein the structural layer comprises a transparent structural layer.

13. The method of claim 1, wherein the structural layer comprises an opaque structural layer.

14. A method of printing a three-dimensional object on a base using a printing device, the method comprising:
   printing a color layer of the three-dimensional object onto a region of the base, the color layer having a color thickness corresponding to a selected color intensity of a color;
   determining a structural thickness for a structural layer of the three-dimensional object by calculating a difference between the color thickness and a target thickness of the three-dimensional object, wherein the target thickness is greater than the color thickness; and
   printing the structural layer having the structural thickness directly onto the color layer.

15. The method of claim 14, wherein:
   after printing the color layer and prior to printing the structural layer, the method further comprises partially curing the color layer; and
   after printing the structural layer, the method further comprises fully curing the structural layer and the color layer.

16. The method of claim 14, wherein the color layer is formed of a print material comprising one or more pigments forming the color.

17. The method of claim 16, wherein the structural layer is formed of a transparent material.

18. A method for printing a three-dimensional object on a base, the method comprising:
   printing a structural layer of the three-dimensional object on a plurality of regions of the base, wherein in a first region of the plurality of regions, the structural layer has a first portion with a first structural thickness, wherein in a second region of the plurality of regions, the structural layer has a second portion with a second structural thickness which is less than the first structural thickness, wherein the first portion of the structural layer and the second portion of the structural layer are adjacent;
   printing a first color layer of the three-dimensional object directly on the first portion of the structural layer, wherein the first color layer has a first color thickness, and wherein the first color thickness of the first color layer and the first structural thickness of the structural layer together form a target thickness of the three-dimensional object; and
   printing a second color layer of the three-dimensional object directly on the second portion of the structural layer, wherein the second color layer has a second color thickness which is greater than the first color thickness, wherein the second color thickness of the second color layer and the second structural thickness of the structural layer together form the target thickness of the three-dimensional object, and wherein the first color layer and the second color layer are adjacent.

19. The method of claim 18, wherein at least part of the first portion of the structural layer and at least part of the second portion of the structural layer are printed in one pass of a printhead, and wherein at least part of the first color layer and at least part of the second color layer are printed in another pass of the printhead.

20. The method of claim 18, wherein prior to printing the structural layer, the first color layer, and the second color layer, the method further comprises:
   obtaining the target thickness of the three-dimensional object;
   obtaining the first color thickness of the three-dimensional object, the first color thickness corresponding to a first designated color intensity of a first color;
   determining the first structural thickness of the three-dimensional object by calculating a difference in thickness between the target thickness and the first color thickness;
   obtaining the second color thickness of the three-dimensional object, the second color thickness corresponding to a second designated color intensity of a second color; and
   determining the second structural thickness of the three-dimensional object by calculating a difference in thickness between the target thickness and the second color thickness.

* * * * *